(12) United States Patent
Mohajer et al.

(10) Patent No.: US 10,373,618 B2
(45) Date of Patent: Aug. 6, 2019

(54) NATURAL LANGUAGE RECOMMENDATION FEEDBACK

(71) Applicant: SoundHound, Inc., Santa Clara, CA (US)

(72) Inventors: Kamyar Mohajer, San Jose, CA (US); Robert Macrae, Mountain View, CA (US)

(73) Assignee: SOUNDHOUND, INC., Santa Clara, CA (US)

( * ) Notice: Subject to any disclaimer, the term of this patent is extended or adjusted under 35 U.S.C. 154(b) by 0 days.

(21) Appl. No.: 15/670,975

(22) Filed: Aug. 7, 2017

(65) Prior Publication Data
US 2019/0043493 A1 Feb. 7, 2019

(51) Int. Cl.
G06F 16/22 (2019.01)
G10L 15/18 (2013.01)
G10L 15/22 (2006.01)
G10L 15/30 (2013.01)
G10L 17/00 (2013.01)
G06F 16/242 (2019.01)
G06F 16/2457 (2019.01)

(52) U.S. Cl.
CPC ............ *G10L 15/22* (2013.01); *G06F 16/22* (2019.01); *G06F 16/243* (2019.01); *G06F 16/2457* (2019.01); *G10L 15/1822* (2013.01); *G10L 15/30* (2013.01); *G10L 17/005* (2013.01); *G10L 2015/223* (2013.01)

(58) Field of Classification Search
CPC .... G06F 17/2785; G06F 16/22; G06F 16/243; G06F 16/2457; G10L 15/22; G10L 15/1822; G10L 15/30; G10L 17/005
See application file for complete search history.

(56) References Cited

U.S. PATENT DOCUMENTS 5,010,478 A * 4/1991 Deran ............... G06F 17/30327
7,328,216 B2 * 2/2008 Hofmann ............. G06F 16/335
(Continued)

OTHER PUBLICATIONS

Michael Fleischman, et al., Recommendations Without User Preferences: A Natural Language Processing Approach, 2003.
(Continued)

*Primary Examiner* — Brian L Albertalli
(74) *Attorney, Agent, or Firm* — Dana Legal Services; Jubin Dana

(57) ABSTRACT

Systems parse natural language expressions to extract items and values of their attributes and store them in a database. Systems also parse natural language expressions to extract values of attributes of user preferences and store them in a database. Recommendation engines use the databases to make recommendations. Parsing is of speech or text and uses conversation state, discussion context, synonym recognition, and speaker profile. Database pointers represent relative attribute values. Recommendations use machine learning to crowdsource from databases of many user preferences and to overcome the cold start problem. Parsing and recommendations use current or stored values of environmental parameters. Databases store different values of the same user preference attributes for different activities. Systems add unrecognized attributes and legal values when encountered in natural language expressions.

19 Claims, 24 Drawing Sheets

(56) References Cited

U.S. PATENT DOCUMENTS

| | | | | |
|---|---|---|---|---|
| 7,668,821 | B1* | 2/2010 | Donsbach | G06Q 30/0631 707/765 |
| 7,970,767 | B2* | 6/2011 | Probst | G06F 17/241 707/739 |
| 8,005,842 | B1* | 8/2011 | Pasca | G06F 16/951 707/741 |
| 8,117,199 | B2* | 2/2012 | Ghani | G06Q 30/02 705/26.7 |
| 9,922,352 | B2* | 3/2018 | Tegegne | G06Q 30/0282 |
| 9,978,362 | B2* | 5/2018 | Dolan | G06F 16/00 |
| 2005/0004880 | A1* | 1/2005 | Musgrove | G06Q 30/0253 705/400 |
| 2007/0282892 | A1* | 12/2007 | Probst | G06F 17/27 |
| 2011/0040790 | A1* | 2/2011 | Tateno | G06Q 30/02 707/780 |
| 2011/0252031 | A1* | 10/2011 | Blumenthal | G06Q 30/02 707/733 |
| 2014/0074828 | A1* | 3/2014 | Mathur | G06F 16/248 707/723 |
| 2014/0257795 | A1* | 9/2014 | Birnbaum | G06F 17/2765 704/9 |
| 2014/0304106 | A1* | 10/2014 | Dahan | G06Q 30/0631 705/26.7 |
| 2015/0073932 | A1* | 3/2015 | Nice | G06Q 30/0631 705/26.7 |
| 2015/0154685 | A1* | 6/2015 | Pope | G06Q 30/0631 705/26.62 |
| 2015/0234820 | A1* | 8/2015 | Aravamudan | G06F 16/735 707/769 |
| 2016/0125048 | A1* | 5/2016 | Hamada | G06F 16/24578 707/734 |
| 2016/0163311 | A1* | 6/2016 | Crook | G10L 15/183 704/275 |
| 2016/0259862 | A1* | 9/2016 | Navanageri | G06F 16/955 |
| 2016/0275594 | A1* | 9/2016 | Mullakkara Azhuvath | G06F 17/3053 |
| 2016/0314200 | A1* | 10/2016 | Markman | G06F 16/35 |
| 2016/0378757 | A1* | 12/2016 | Bahl | G06N 5/04 707/728 |
| 2017/0032477 | A1* | 2/2017 | Kamen | G06F 16/285 |
| 2017/0200207 | A1* | 7/2017 | Aswani | G06Q 30/0603 |
| 2018/0052842 | A1* | 2/2018 | Hewavitharana | G06F 17/2705 |
| 2018/0101888 | A1* | 4/2018 | Akkiraju | G06Q 30/0204 |
| 2018/0189857 | A1* | 7/2018 | Wu | G06Q 50/01 |

OTHER PUBLICATIONS

Shuo Chang, et al., Crowd-Based Personalized Natural Language Explanations for Recommendations, ACM, RecSys '16, Sep. 15-19, 2016, Boston, MA, USA.

Pasquale Lops, et al., Content-based Recommender Systems: State of the Art and Trends, Recommender Systems Handbook, Springer, 2011.

Brian Whitman, et al., Inferring Descriptions and Similarity for Music from Community Metadata, International Computer Music Association, 2002.

Claudiu S. Firan, et al., The Benefit of Using Tag-Based Profiles, Proceedings of the 2007 Latin American Web Conference, pp. 32-41 Nov. 2, 2007.

Stephan Baumann, et al., Using natural language input and audio analysis for a human-oriented MIR system, WEDELMUSIC 2002.

Pasquale Lops., et al., Improving Social Filtering Techniques Through WordNet-Based User Profiles, Springer-Verlag Berlin Heidelberg, UM 2007, LNAI 4511, pp. 268-277, 2007.

Kate Ching-Ju Lin, et al., SocioNet: A Social-Based Multimedia Access System for Unstructured P2P Networks, IEEE Transactions on Parallel and Distributed Systems, vol. 21, No. 7, Jul. 2010.

\* cited by examiner

|        | attributes |    |    |    |
|--------|----|----|----|----|
|        | a0 | a1 | a2 | a3 |
| item 0 |    |    |    |    | ⟵ 61
| item 1 |    |    |    |    |
| ⋮      |    |    |    |    |
| item N−1 |  |    |    |    |

FIG. 6

|  | attributes | | | |
|---|---|---|---|---|
|  | a0 | a1 | a2 | a3 |
| item 0 |  |  |  |  |
| item 1 |  | • |  |  |
| item 2 |  |  | → |  |
| item 3 |  |  |  |  |

NATURAL LANGUAGE RECOMMENDATION FEEDBACK

FIELD OF THE INVENTION

The present invention is in the field of recommender systems, specifically ones that use machine learning algorithms based on parsing of natural language expressions.

BACKGROUND

Human language is complex. Whether describing songs, movies, news stories, travel destinations, web search results, people to meet, products to purchase, patents, or anything else, natural language expressions have far more ways to describe items than databases of items have ways to categorize them. What's needed is a system that learns about items from people's rich and subjective natural language descriptions and offers those items when others make similar requests.

SUMMARY OF THE INVENTION

The present disclosure describes novel machines, machine-implemented processes, and non-transitory computer readable media that involve learning about items from people's rich descriptions and offers those items when others make similar requests.

BRIEF DESCRIPTION OF THE DRAWINGS

FIG. 6 illustrates an item database of attribute values, according to an embodiment.

FIG. 8 illustrates an item database of attribute values with a reference to another item, according to an embodiment.

DETAILED DESCRIPTION

Figure 1:
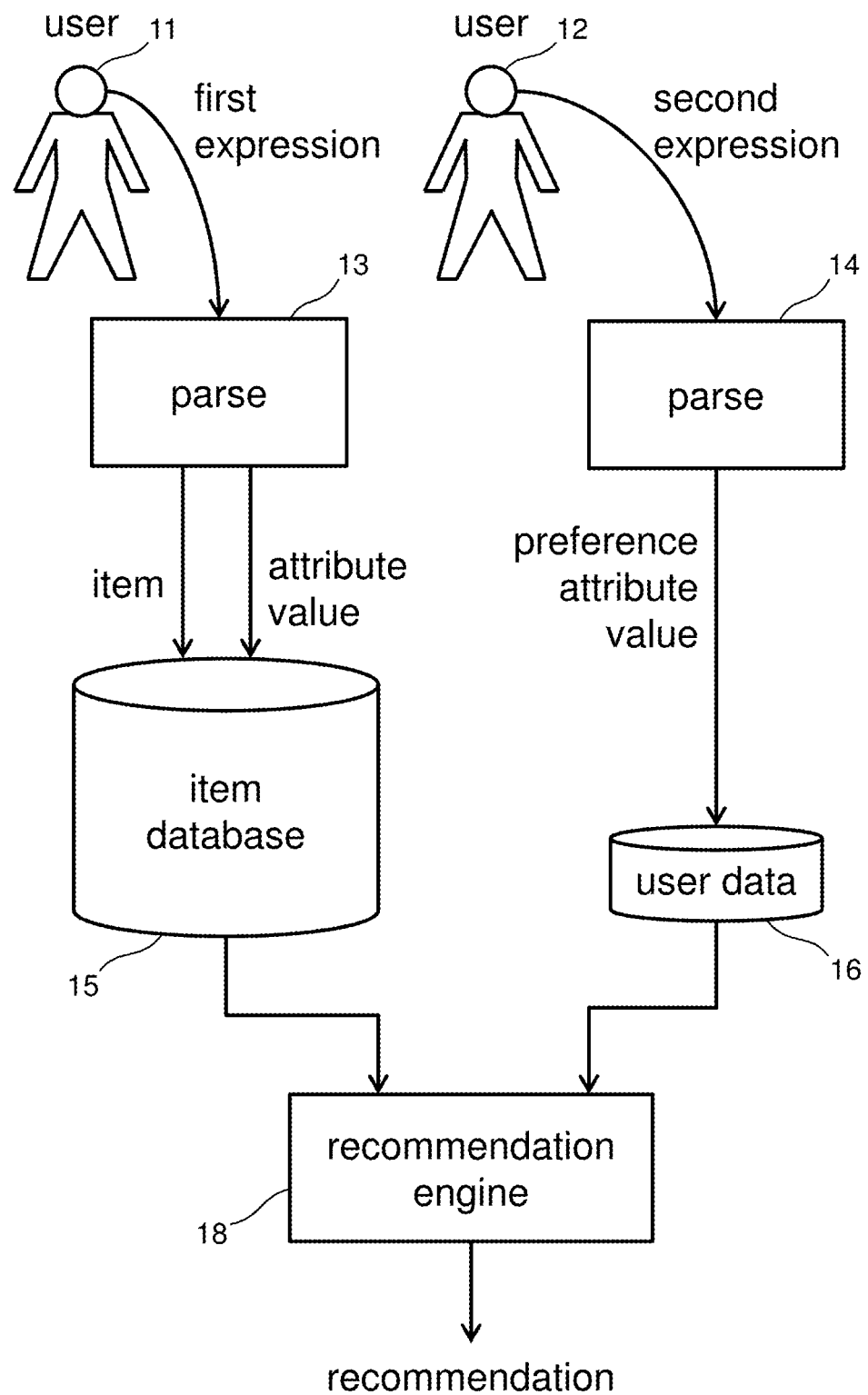
FIG. 1 illustrates parsing expressions to extract and store items attribute values and preference attribute values in databases and use the data to produce recommendations, according to an embodiment.

All statements herein reciting principles, aspects, and embodiments as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

It is noted that, as used herein, the singular forms "a," "an" and "the" include plural referents unless the context clearly dictates otherwise. Reference throughout this specification to "one embodiment," "an embodiment," "certain embodiment," or similar language means that a particular aspect, feature, structure, or characteristic described in connection with the embodiment is included in at least one embodiment. Thus, appearances of the phrases "in one embodiment," "in at least one embodiment," "in an embodiment," "in certain embodiments," and similar language throughout this specification may, but do not necessarily, all refer to the same embodiment or similar embodiments.

Embodiments of the invention described herein are merely exemplary, and should not be construed as limiting of the scope or spirit of the invention as it could be appreciated by those of ordinary skill in the art. The disclosed invention is effectively made or used in any embodiment that comprises any novel aspect described herein. All statements herein reciting principles, aspects, and embodiments of the invention are intended to encompass both structural and functional equivalents thereof. It is intended that such equivalents include both currently known equivalents and equivalents developed in the future.

Furthermore, to the extent that the terms "including", "includes", "having", "has", "with", or variants thereof are used in either the detailed description and the claims, such terms are intended to be inclusive in a similar manner to the term "comprising".

Some embodiments parse natural language expressions to identify: items, attributes of the items, and values of the attributes. For example, regarding a red color car, car is an item, its color is an attribute, and red is a value of the color attribute. Some embodiments store, in item databases, identifiers of specific items and values of attributes of the items. For example, regarding a database of paint colors, if a user says, "that canary yellow is too bright", a system stores, for the "canary yellow" paint color item, a value "True" for a "bright" attribute. Regarding a database of sneaker types, if a user says, "but those Mary Jane shoes are for toddlers", a system stores for the "Mary Jane" shoe item, a value "toddler" for a "size category" attribute.

Some embodiments parse natural language expressions to identify: users; attributes for which specific users have preferences, and values of the preferences. Some embodiments store, in user databases, identifiers of specific users and values of preferences of the users. For example, if a user says, "my favorite color is chartreuse", a system stores, for the user, the value "chartreuse" for a "favorite color" attribute. If a user says, "play some country music", a system stores, for the user, the value "country" for the "preferred music genre" attribute.

Some embodiments use recommender systems ("recommendation engines") on item databases along with vectors of specific user preferences to make recommendations, such as playlists of songs.

Some embodiments determine both item attribute values and user preference values from a single natural language expression. For example, regarding a user expression "I like big boots" when looking at particular pair of boots from a footwear retailer a system stores in a database of shoes, for the particular pair of boots, a value "big" for a "size category" attribute and, also, the system stores, in a user database, for the user, a value of "big" for the "preferred size category" attribute.

Some embodiments store, in their item databases, values of environmental parameters in association with attribute values. Some examples of environmental parameters are locations, times, current activity such as cooking or exercising, and currently playing songs. For example, regarding a music playing system, if a user says, "increase the volume to 7" when the player is moving at a jogging pace in the afternoon, the system stores, for the user, the value "7" for a preferred volume attribute in association with a value "afternoon" for a time parameter and "jogging" for an activity parameter. For the same system, if a user says, "turn the volume down to 3" when the player is in a residential building in the late evening, the system stores, for the user, the value "3" for a preferred volume attribute in association with a value "late evening" for a time parameter and "at home" for an activity parameter.

Some embodiments include environmental parameters as inputs to recommendation engines to condition the recommendations.

Some embodiments store, in their item databases, references to other items in association with the values of the attributes of items. This enables embodiments to store relative values. For example, regarding a database of celebrity people, for a user expression, "Melania Trump is 24 years younger than her husband", a system looks up relationship information from a database of facts to determine that Donald Trump is the husband of Melania Trump. The system proceeds to store, for a "Melania Trump" for an "age" attribute, a value of "less than" and an associated pointer to an "age" parameter for a "Donald Trump" item. For example, regarding a database of sports cars, for a user expression, "a Tesla Model S accelerates faster than a Porsche 911 Carrera S can brake", a system stores, for a "Tesla Model S" item for an "acceleration" attribute, a value of "greater than" and an associated pointer to a "braking speed" parameter for a "Porsche 911 Carrera S" item. Some embodiments determine values of attributes without references by parsing natural language expressions that make references to the values of attributes of other items. For example, regarding a database of mountains, for a user expression, "Mount Whitney is ½ the height of Mount Everest", a system stores, for a "Mount Whitney" item, "4424 meters" as the value for a "height" attribute by multiplying the value (8848 meters) of the "height" attribute for the "Mount Everest" item by ½.

Some embodiments, compute hypotheses of unknown attribute values in sparse user preference vectors in order to make recommendations. The hypotheses are based on the known preference values of other users, and are computed using machine learning algorithms such as classifiers or regressions. For example, regarding a system for profiling shoppers, if it identifies 19 of 100 female shoppers as wearing pink shirts and 1 out of 100 male shopper as wearing pink shirts, upon identifying a new shopper as wearing a pink shirt will compute a probability of ¹⁄₂₀ that the shopper has a value "male" for a "gender" attribute and ¹⁹⁄₂₀ that the shopper has a value "female" for a "gender" attribute.

Some embodiments use scores, expressed as non-Boolean values, to represent attribute values and preferences. For example, rather than representing a song attribute of a fast tempo as either true or false, such an embodiment stores a tempo value of 115 beats per minute. For another example, rather than representing a preference value hypothesis as true or false, such an embodiment represents it as a probability value between 0 and 1.

Some embodiments respond to natural language commands. For example, regarding a user database, in response to a user command, "navigate to the nearest romantic restaurant", a system stores a value "romantic" for a "preferred restaurant type" attribute. In response to a user command, "play a different movie with less violence", a system stores a value of "low" for a "preferred amount of movie violence" parameter.

Some embodiments respond to natural language expressions of time periods, such as, "play dinner party jazz songs for the next 3 hours" or "this morning's songs were all boring".

Some embodiments determine values of environmental parameters by parsing natural language expressions. For example, in response to a user expression, "only bring vegetarian food to Maya's house", a system stores a value "vegetarian" for a "food preference" attribute associated with a "Maya's house" value for a "location" environmental parameter. In response to a user expression, "Pump up the Jam is an awesome workout song", stores, for a song item "Pump up the Jam", a value "true" for a parameter "awesome" in association with a "workout" value for an "activity" environmental parameter.

Some embodiments determine activities from environmental parameters, such as cooking, exercising, driving, or sleeping and associate user preferences for the attribute with the activity, such as by using a wall-clock timer, a geolocation service, accelerometers, ambient audio processing, and camera image processing.

Some embodiments, upon identifying, in a natural language expression, an attribute that is not known in an item database or user database add the attribute and thereby learn new ways of describing items and preferences. For example, regarding a music identification system, in response to a user expression, "Wind Beneath My Wings has such a pop schmaltz flavor.", a new system detects that it does not recognize "flavor" as an attribute of song items. It therefore proceeds to create a new attribute, "flavor", and for the song item "Wind Beneath My Wings" assigns a value "pop schmaltz" to the new "flavor" attribute.

Some embodiments, upon identifying, in a natural language expression, an attribute value this is not known in an item database or user database add the value as a possible value of the attribute and thereby learn new possible descriptions of items and preferences. For example, regarding a music identification system, in response to a user expression, "Alexa, I hate Green Day. Stop playing that punktaculous garbage!" detects that "punktaculous" is not recognized as an existing value for the "genre" attribute. It therefore proceeds to define "punktaculous" as a recognized value for a "genre" attribute.

Even the most creative and foresighted designers of recommendation engines cannot define enough attributes and legal values of those attributes to capture all ways that items can be described with natural language. Furthermore, language is always evolving. Users may use words that are not known in any dictionary. An example is slang adjectives made by combining parts of other adjectives, such as "fantabulicious", made from parts of "fantastic", "fabulous", and "delicious".

Speakers may refer to items in terms that do not match commonly accepted categories, but which are still meaningful to listeners. For example, systems that categorize music tend to include attributes such as track name, artist name, genre, length, album name, composer name, and tempo. However, people will recognize that some songs have a very futuristic feel, some have a slightly futuristic feel, and some don't feel futuristic at all. Conventional systems that categorize music don't have a "feel" attribute and if they do, don't recognize "futuristic" as a legal value. Neither do such systems have a "futuristicness" attribute with a scale from "very" to "slightly" to "not at all".

Furthermore, even for known attributes, humans can create values that are self-defining. For example, some people may describe a music genre attribute as having the value, "stomp folk". Music recommender systems do not recognize that value, but many people could infer the style of music from the name, even if never having heard it before.

Even if recommendation engines could have adequately descriptive attributes and legal values, they would require endless, laborious updates to accommodate evolving language.

A Basic Embodiment

FIG. 1 shows an embodiment. A first user 11 makes a first natural language expression that includes information that identifies and describing a particular item. A parser 13 parses the first expression to extract at least one identifier of an item and at least one value of an attribute of the item. The value of the attribute, in association with the identifier of the item is stored in an item database 15. These steps may occur repeatedly for numerous items and multiple attributes of items. Some embodiments can recognize expressions from multiple users. Accordingly, item database 15 grows to include descriptive attribute values for many items.

The parsing 13 of some embodiments identifies pronouns and resolves their references to determine item identifiers. For example, when looking at a wedding dress with item identifier B00JKMUB58 on an online shopping web site, if the first user, Adrianne, says, "I love the delicate Chantilly lace material", a "cloth material" attribute, associated with item identifier "B00JKMUB58" in the database is assigned value, "Chantilly lace".

Many types of databases and methods of organizing data within databases are known and applicable to various embodiments.

According to the embodiment of FIG. 1, a second user 12 makes a second natural language expression that includes information that identifies values of attributes that the user prefers. It is possible that the users are separate and unrelated. A parser 14 parses the second expression to extract at least one attribute that items can have, a value for the attribute, and identify that the second user 12 prefers such items with that value. The attribute value is stored in a user database 16 in association with the second user 12. Some embodiments store dislikes as well as preferences. For example, if, when discussing his likes and dislikes, a second user, Jiles, says, "Chantilly lace is what I like", user database 16 stores a value of "Chantilly lace" for a "cloth material" preference attribute associated with Jiles. While the parser 13 and parser 14 are shown as two different units, in accordance with some aspects and embodiments of the invention, the parser 13 and parser 14 maybe the same logical unit that performs the equivalent function. This is useful for some server-based systems that use a single parser process for all expressions.

Some embodiments extract identifiers of third users, determine that expressions identify preferences for the third users, and store the preference in association with the third user. This is useful for third-party expressions such as, "Isaac wants a telescope for Christmas", in which case a person, "Isaac" has a value "telescope" assigned to a "wants for Christmas" attribute. Some embodiments provide for attribute values to be lists. For a following user expression, "he also wants a prism, a calculator, and an apple", the system assigns the value, "telescope, prism, calculator, apple" to the attribute "wants for Christmas".

User database 16 stores a user preference vector for each identifiable user. In different embodiments, the user database comprises either one global or a plurality of smaller databases. Smaller databases can be as small as having a single user's vector. Some embodiments coordinate access to large global databases using distributed data storage frameworks such as Hadoop. A user preference vector is a set of all possible attribute preferences. It is possible for a preference vector to have known values for some attributes and no known values for other attributes. Vectors that have some attributes with unknown values are sparse vectors.

According to the embodiment of FIG. 1, a recommendation engine 18 uses the second user's preference vector from user database 16 and the attribute values of items in item database 15 to produce a recommendation. There are many known types of recommendation engines, mostly implemented as software. Types of recommendation engines appropriate for different applications will be recognized by practitioners.

For an online shopping application, if Jiles logs on to the web site to buy a dress as a gift, the web site will show him Chantilly lace dresses.

Figure 2:
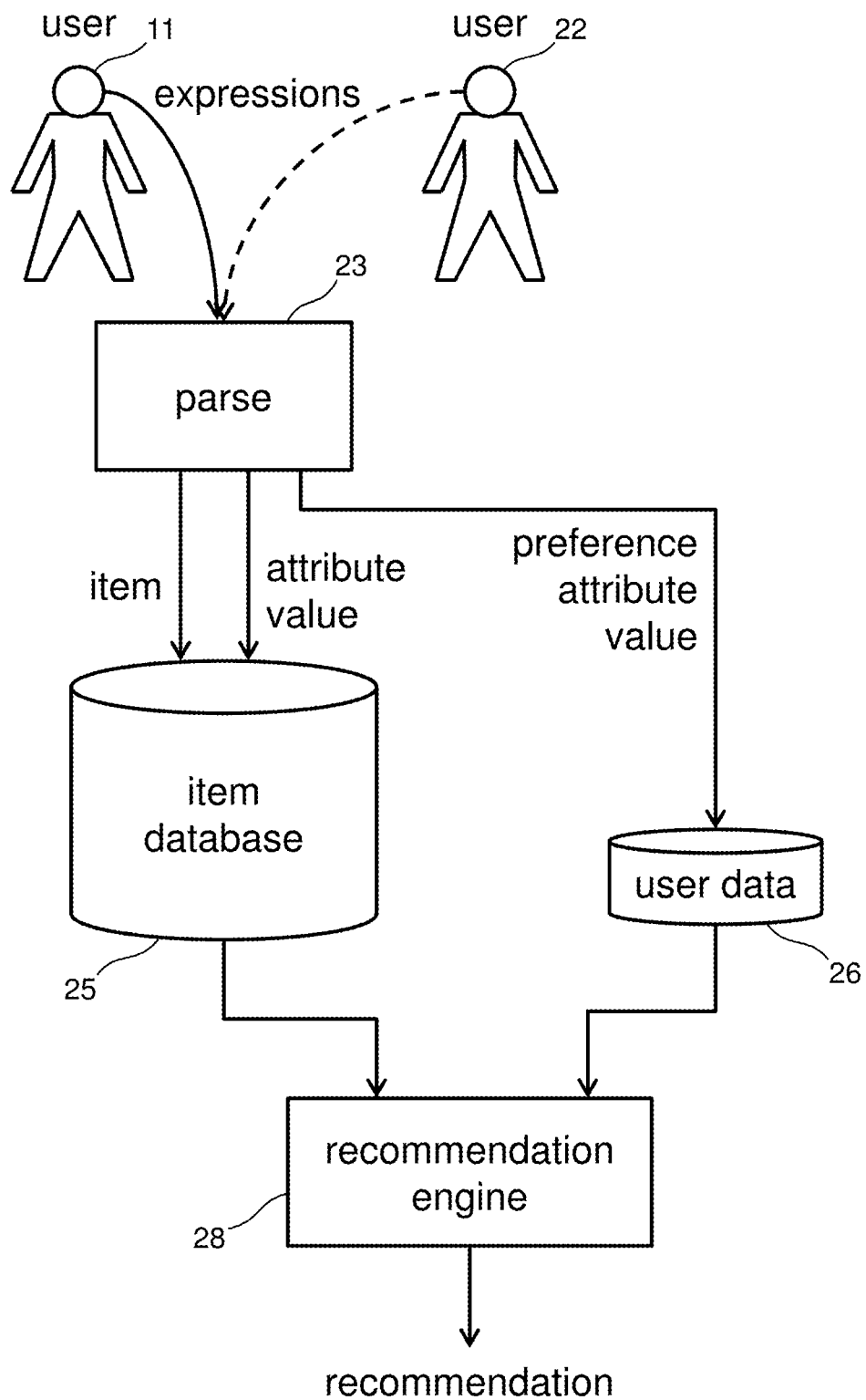
FIG. 2 illustrates parsing a single expression to extract and store both items attribute values and preference attribute values in databases and use the data to produce recommendations, according to an embodiment.

FIG. 2 shows another embodiment. A user 11 makes a natural language expression that includes information about a value of an attribute of a particular item and a preference for the attribute. Parser 23 extracts all the information. The attribute value associated with the item is stored in an item database 25. The value of the preference attribute is stored in a user database 26. A recommendation engine 28 uses the user preference information from the user database 26 and information about items in the item database 25 to produce recommendations for the user 11. For example, in a machine-automated shoe store, if a shopper says, "I like these blue suede shoes", the item database will store, in association with the particular pair of shoes, a value "blue" for a color attribute and a value "suede" for a material attribute. Knowing shopper's preference for blue color and suede material shoes, the store will proceed to show the shopper other shoes from the item database that are suede and other shoes that are blue.

Some embodiments, such as some server systems, have a single parser. Some server systems have multiple parsers. Some embodiments do separate parsing in different devices and locations. In some scenarios an embodiment receives both item attribute values and preference attribute values from the same user. In some scenarios an embodiment receives item and attribute values from one user and preference attribute values from a second user. FIG. 2 shows a second user 22 who makes expressions to a single parser 23. User 22 may be present in some scenarios but not in others.

Some embodiments produce single recommendations at a time. Some embodiments provide lists of recommendations. Some embodiments store attribute values that are Boolean (true or false) such as an automobile having a steering wheel or not. Some embodiments store attribute values as enumerated types, such as automobiles being black, white, grey, red, blue, yellow, or pink. Some embodiments store attribute values numerically, such as a tempo of a song in units of beats per minute. Some embodiments store attribute values as probabilities represented by floating point numbers, such as a likelihood of a particular flight number arriving on time. Some embodiments store attribute values as text strings, such as a description of a feeling of a song as "slightly jazzy".

Parsing

Figure 3:
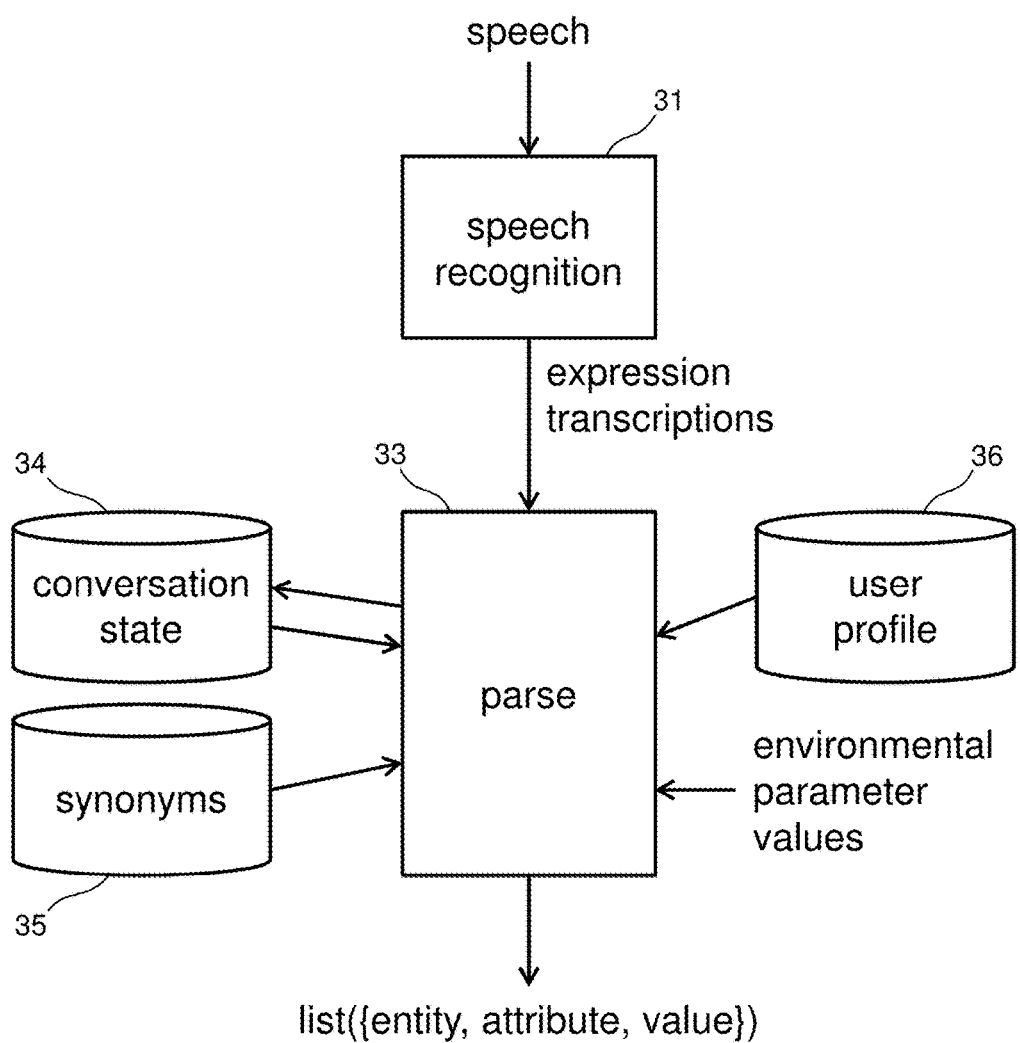
FIG. 3 illustrates parsing spoken natural language expressions, according to an embodiment.

FIG. 3 shows parsing according to an embodiment. Speech recognition 31 receives speech comprising spoken natural language expressions. Speech recognition 31 outputs a textual transcription of the speech. Some embodiment output multiple transcription hypotheses, each having an associated score that indicates the likelihood that it is correct. Parser 33 receives the transcription hypotheses and outputs a list of entities, attributes, and values that are asserted in the natural language expression. For example, for an expression, "John likes vanilla but his ice cream cone has chocolate. Marie's ice cream cone has vanilla, but she likes chocolate", the parser outputs a list with four elements: {John, preferred ice cream flavor, vanilla}; {John's ice cream cone, flavor, chocolate}; {Marie's ice cream cone, flavor, vanilla}; {Marie, preferred ice cream flavor, chocolate}.

The embodiment of FIG. 3 maintains conversation state information 34. This includes information such as entities being discussed and the what, when, where of items of discussion. The system uses conversation state to disambiguate pronouns. For example, if a machine says, "bus number 10 arrives in 20 minutes", and a user says, "when does it depart?", the parser 33 knows, from reading information from conversation state 34, that the term "it" refers to bus number 10. Whenever a system gives information to a user and whenever a user gives information to a system parser 33 writes the information to the conversation state 34.

The embodiment of FIG. 3 maintains a database of synonyms 35. By searching for words from natural language expressions in the synonym database 35, the parser 33 is able to interpret statements with otherwise unknown meanings. For example, the commands "withdraw 20 bucks", "withdraw 20 clams", "withdraw 20 bones", and "withdraw 20 smackers" are all interpreted as meaning, "withdraw 20 US dollars". By replacing terms with a common synonym, a system is able to match expression with equivalent meaning expressed with different vernaculars.

The embodiment of FIG. 3 maintains user profile information 36. When parser 33 needs personal information to complete parsing, it reads from profile information 36. For example, the command, "send roses to my work address on my birthday so that my coworkers think that I have a secret admirer", uses a birthday parameter from user profile 36 to choose a delivery date and a work address parameter from user profile 36 to choose a delivery address. The embodiment further writes the value, "roses", for a "preferred flower type" attribute in a user database. The system uses personal reference identifier words, such as "my" to determine expression semantics that are specific to a user profile.

In the embodiment of FIG. 3, parser 33 accepts and uses environmental parameter values to complete parses. For example, it uses the current location parameter and date parameter to interpret the expression, "what's the weather" as a request for a weather report for the current day and location. By doing so, the system adds to the meaning interpretation information implicit in environmental parameters.

Though conventional natural language processing systems can ably handle expressions about what, when, where, and who, they are unable to do anything with expressions about why, which require richly detailed expressions. Some present embodiments, by using speech recognition user interfaces, allow users to precisely describe why the like or dislike an item or class of items. Similarly, users can precisely say what classes of items they would like to have recommended. For example, regarding music recommendations, users are able to say, "I want something with more jazz", "I like faster songs", "less melodramatic", or "I'm not a fan of these lyrics". These are reasons for preferences of item classes, which are stored in user databases and enable more accurate recommendations based on richly descriptive attributes and attribute values stored in item databases.

Figure 4:
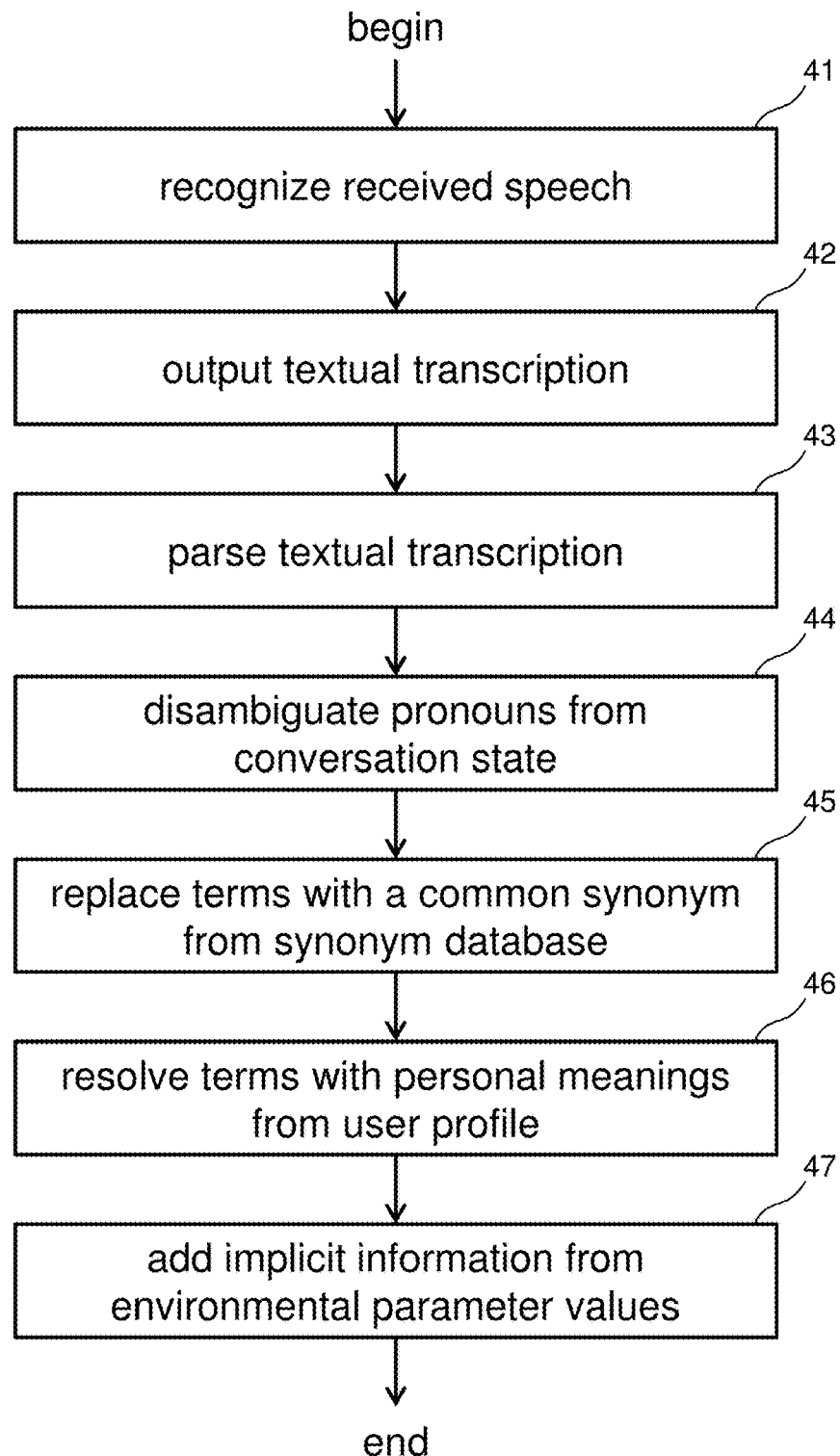
FIG. 4 illustrates a flow chart of parsing spoken natural language expressions, according to an embodiment.

FIG. 4 shows a flowchart of a speech recognition and natural language parsing process according to an embodiment. In step 41 the process begins by receiving speech and applying speech recognition. In step 42 the process proceeds to output a textual transcription from the speech recognition. In step 43 the process receives the transcription at a parser and begins the parsing process. In step 44 the process disambiguates pronouns from conversation state. In step 45 the process replaces terms with common synonyms from a synonym database. In step 46 the process resolves terms with personal meaning from the speaker's user profile. In step 47 the process adds implicit information from environmental parameter values.

Figure 5:
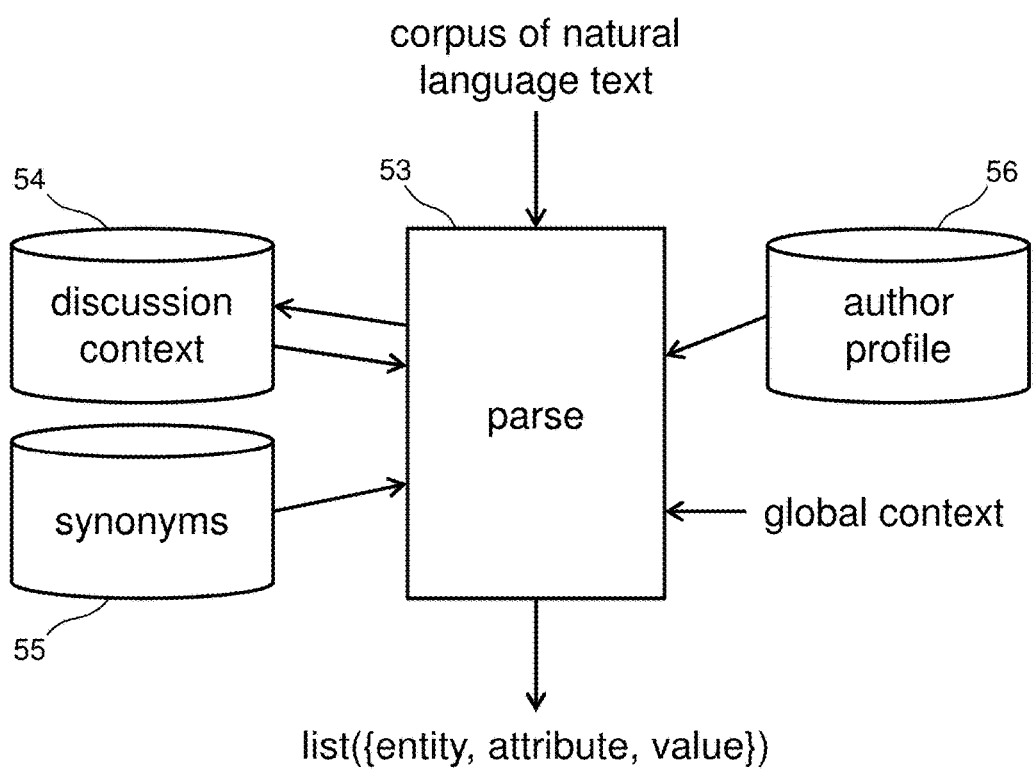
FIG. 5 illustrates parsing textual natural language expressions, according to an embodiment.

FIG. 5 shows parsing according to an embodiment that uses a corpus of textual natural language expressions. This is especially useful for building item databases from corpuses of written information. For example, book and movie reviews tend to use rich natural language descriptions of items that are useful to improve the usefulness of recommendations based on rich descriptions of user preferences. Different corpuses of written material are appropriate for different applications. Some use Wikipedia, New York Times newspaper articles, blog posts, and Twitter feeds.

Parser 53 receives natural language expressions as text from a corpus and outputs lists of entities, attributes, and values that are asserted in the natural language expression. The entities and attribute values are sent to in an item database.

The embodiment of FIG. 5 maintains discussion context information 54. This includes information such as entities being discussed and the what, when, where of items of discussion. For example, if a movie review says, "Wes Craven is the master of horror films" followed by "In Scream 7 he delivers another", the parser 53 knows, from reading information from discussion context 54, that the movie entity "Scream 7" has "director" attribute value "Wes Craven" and "genre" attribute value "horror". As the embodiment parses the corpus of text, parser 53 writes its detected information to the discussion context 54.

The embodiment of FIG. 5 maintains a database of synonyms 55, operating as and for the same purpose as synonym database 35, described above.

The embodiment of FIG. 5 maintains author profile information 56. When parser 53 needs personal information about the author of a movie review or blog post to complete parsing, it reads from author profile information 56.

In the embodiment of FIG. 5, parser 53 accepts and uses global context information to complete parses. For example, it uses the date of publication of a year 2001 movie review to interpret the expression, "last year's best film was Battlefield Earth" as referring to the movie from the year 2000.

Databases

The output of the parsers of FIG. 1 and FIG. 2 are written to item databases and user databases. Different types of databases are appropriate for different applications. Some databases are relational, some are self-referential, some are distributed such as ones using Hadoop, some are custom, some use industry standards, some store item information, some store user information, some store both item information and user information, some are sorted, some are not.

FIG. 6 shows a logical representation of an item database 61. Each row represents a particular item. The database 61 has a row for each of a number N of items. Database 61 has a column for each of a number of attributes. This embodiment has only four, named a0, a1, a2, and a3. Any number of items and any number of attributes can be managed by the database 61 and the scope of the invention is not limited thereby.

Figure 7:
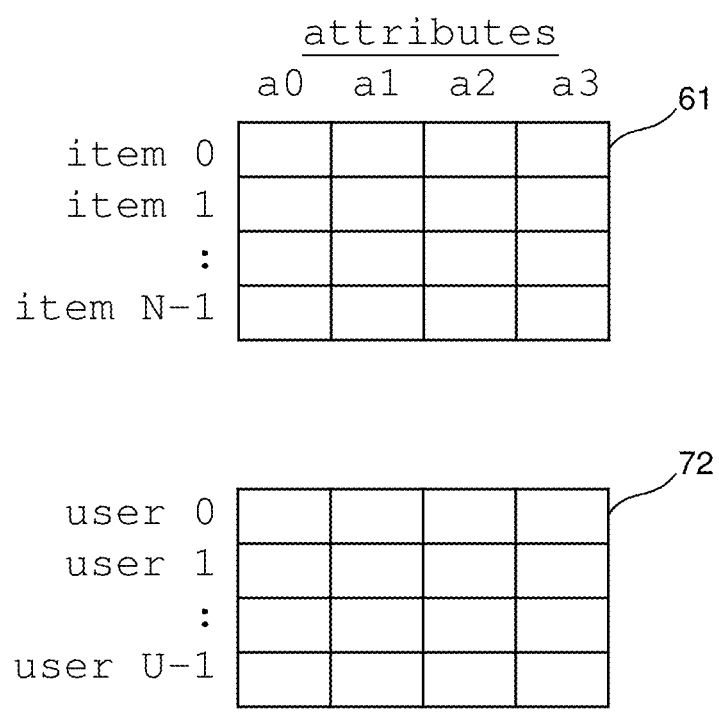
FIG. 7 illustrates an item database and a corresponding user database of attribute values, according to an embodiment.

FIG. 7 shows a logical representation of item database 61 juxtaposed with a user database 72. The user database 72 has a row for each of a number U of users. Database 71 has a column for each of the same attributes as those of item database 72. Any number of users can be managed by the database 72 and the scope of the invention is not limited thereby.

FIG. 8 shows a logical representation of an item database 81 with a relative reference. If item 1 is a second grade classroom and item 2 is a third grade classroom and attribute a1 is a number of students and a2 is a number of desks, then in response to an expression, "since the first grade classroom has one more student than the second grade classroom has desks, we need to flunk at least one first grade student" the item database 81 is updated such that the value of item 1 attribute a1 (the number of students in the first grade classroom) includes a pointer to item 2 attribute a2 (the number of desks in the second grade classroom) and a relative value of +1.

User Profile Information and Crowdsourcing

Figure 9:
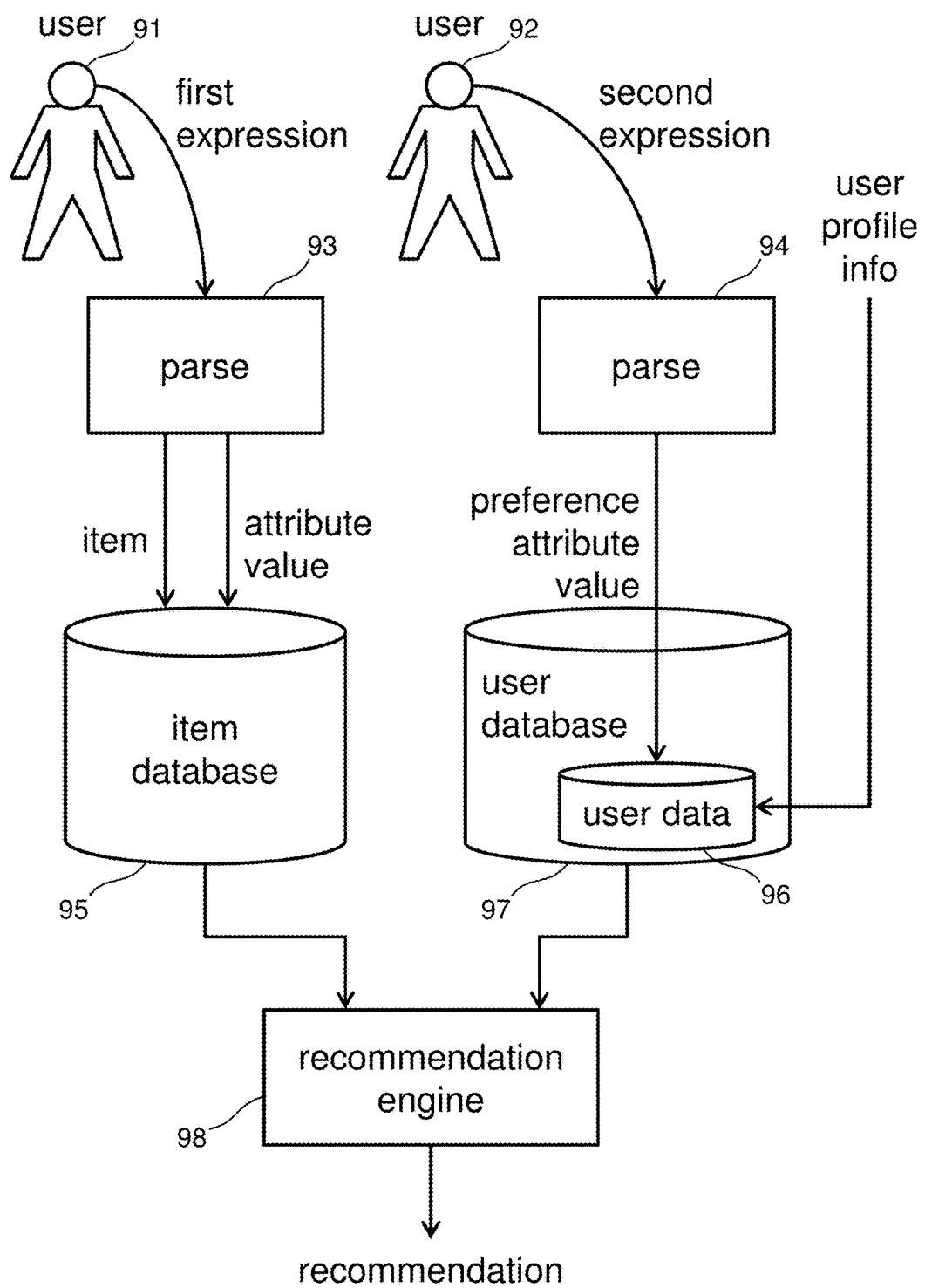
FIG. 9 illustrates parsing expressions to extract and store items attribute values in a database and extract and store preference attribute values for a particular user within a database of many users and using the data to produce recommendations, according to an embodiment.

FIG. 9 shows an embodiment. A first user 91 makes a first natural language expression that includes information that identifies and describing a particular item. A parser 93 parses the first expression to extract at least one identifier of an item and at least one value of an attribute of the item. The value of the attribute, in association with the identifier of the item is stored in an item database 95. A second user 92 makes a second natural language expression that includes information that identifies values of attributes that the user prefers. A parser 94 parses the second expression to extract at least one attribute that items can have, a value for the attribute, and identify that the second user 92 prefers such items with that value. The attribute value is stored in as user data 96 in association with the second user 92.

In the embodiment of FIG. 9, the user data is supplemented with information from a user profile. For example, some user profiles include one or more of parameters: gender, birth date, address, income, religion, political party, name, and registration number, among other information. Some user profile parameters are sparsely populated with known values. Some systems add values to user profile properties in response to extracting the values from user expressions.

User profile parameters are very useful for classifying users. For example, there are significant commonalities of consumption preferences for people of the same gender, birth date, region, income, religion, and political party. However, conventional systems that are great at classifying users based on profile properties alone suffer from a lack of individual preference data. The specific preference data of other users, combined with classification based on both user profile and preferences provides superior classification/prediction accuracy for recommendations.

The embodiment of FIG. 9 includes an entire database of users' preference vectors 97. User data 96 is a single set of one user preference vector (one row of database 72) and user profile property values associated with user 92.

In the embodiment of FIG. 9, a recommendation engine 98 classifies the user's likely preferences by computing hypotheses of unknown user preference attribute values using a machine learning algorithm on the user database 97 and the user profile vector 96. The recommendation engine 98 then finds items in the item database 95 with attribute values that most closely match the known and hypothesized user preference vector values.

This application of artificial intelligence to crowdsourced data enables systems to very accurately predict user preferences and produce very useful recommendations, even for users who assert the same preference, but with different ideas of its meaning. For example, "slow dance music" recommendations for a 16 year old male in the United States would typically be different than for a 40 year old female in Germany.

However, classification algorithms to predict any user preference require knowing at least some of the user's other preferences. If, the first time a user requests a recommendation the system does not know any individual preferences, the system cannot make a useful recommendation. This is known as the cold start problem.

Figure 10:
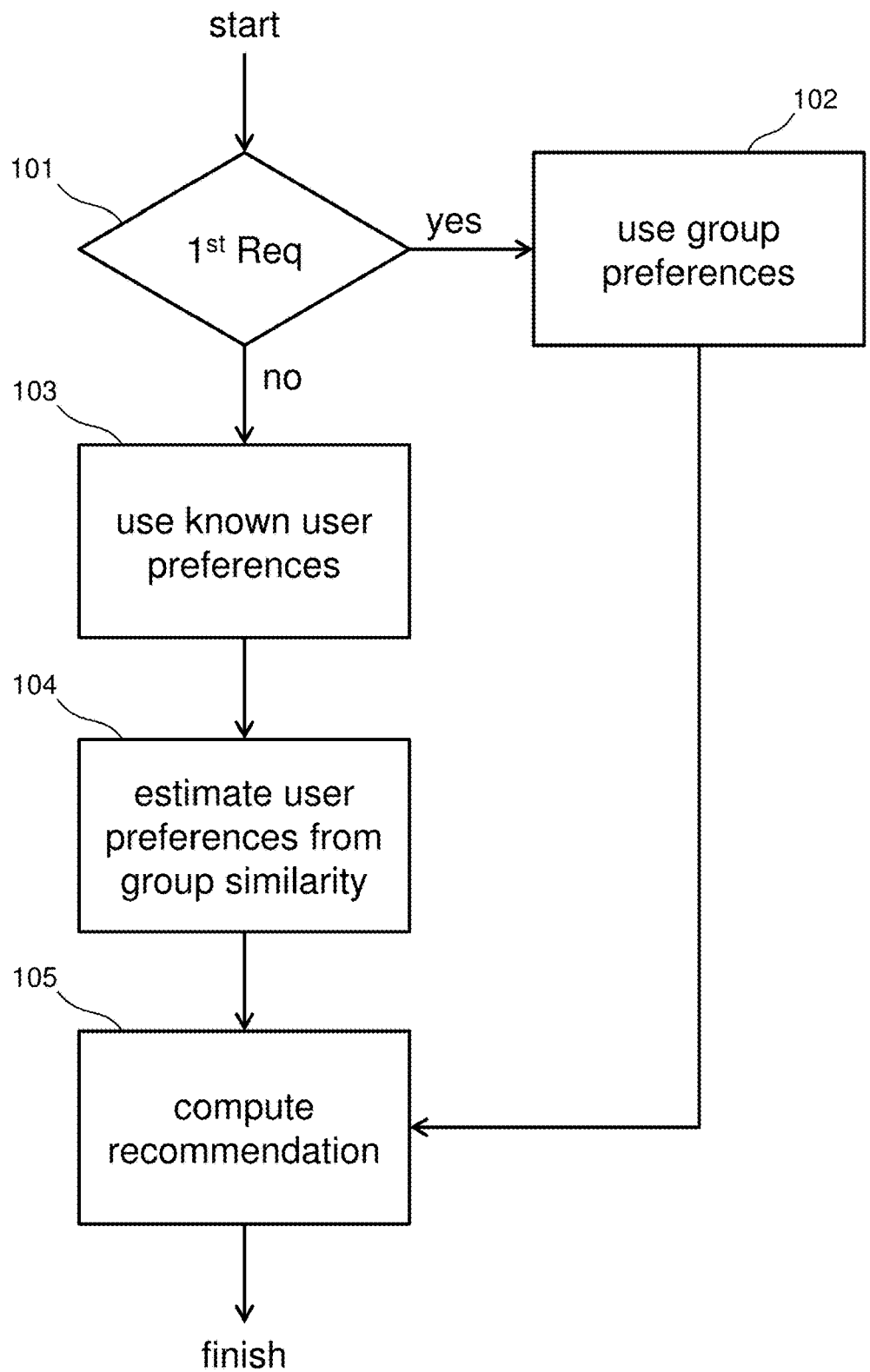
FIG. 10 illustrates a flowchart of a process for using crowdsourcing to overcome the cold start problem, according to an embodiment.

FIG. 10 shows a flow chart for an embodiment that resolves the cold start problem. It starts at decision 101, which determines whether a request for a recommendation is a $1^{st}$ request with no known use preferences. If yes, the system proceeds to step 102, in which it determines a group for the user and uses average or typical preferences for the group. For example, a system knowing that sunscreen is the most frequently purchased item by users at a beach, in response to a new user arriving at a shopping site, determines the user location, assigns the user to a group of users at beaches, and proceeds to step 105 in which the system computes a recommendation. The recommendation being for sunscreen items.

For another example, some embodiments group users by how quickly they speak their name and the spectral components of their voice. Voice spectral components are typically highly affected by gender and age. Accordingly, the system makes much better than randomly relevant recommendations automatically for a first spoken user interaction.

According to the embodiment of FIG. 10, if the request is not the first request, the system proceeds to step 103 in which it uses known values from the user's preference vector, proceeds to step 104 in which it computes hypotheses for other user preference attribute values based on an unsupervised machine learning algorithm, and then proceeds to step 105 in which it computes recommendations from an item database that correspond to the known and computed user preference attribute values.

Environmental Parameters

Figure 11:
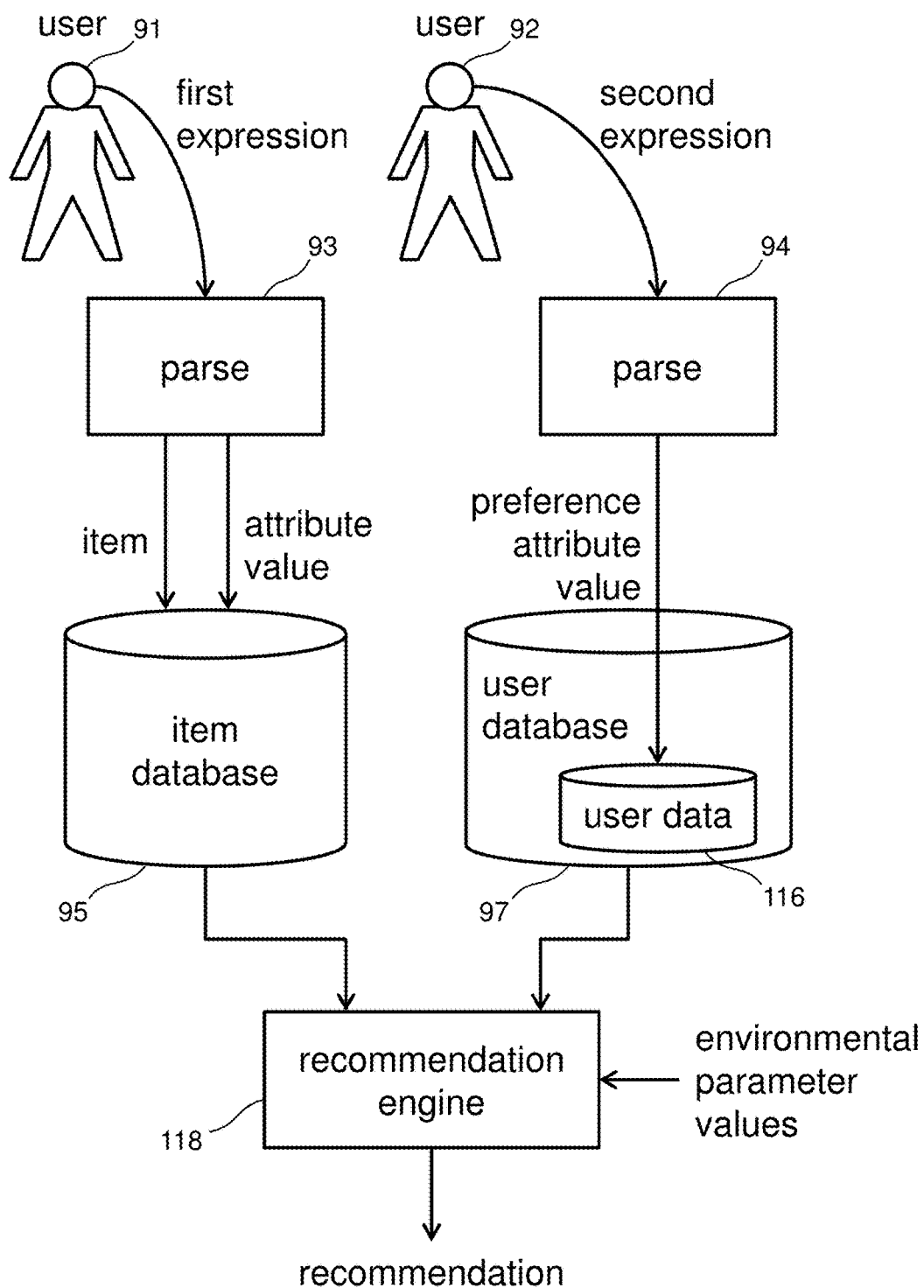
FIG. 11 illustrates parsing expressions to extract and store items attribute values and preference attribute values in databases and use the data, along with environmental parameter values, to produce recommendations, according to an embodiment.

FIG. 11 shows an embodiment that uses environmental parameters to condition recommendations. User 91 makes a first natural language expression that includes information that identifies and describing a particular item. Parser 93 parses the first expression to extract at least one identifier of an item and at least one value of an attribute of the item. The value of the attribute, in association with the identifier of the item is stored in an item database 95. Second user 92 makes a second natural language expression that includes information that identifies values of attributes that the user prefers. Parser 94 parses the second expression to extract at least one attribute that items can have, a value for the attribute, and to identify that the second user 92 prefers such items with that value. The attribute value is stored in user data 106 in association with the second user 92. User data 116 is placed within an entire database of users' preference vectors 97.

In the embodiment of FIG. 11, a recommendation engine 118 classifies the user's likely preferences by computing hypotheses of unknown user preference attribute values using a machine learning algorithm on the user database 97 and the user's profile vector 116. The recommendation engine 108 then finds items in the item database 95 with attribute values that most closely match the known and hypothesized user preference vector values.

Recommendation engine 118 further considers environmental parameter values. Some examples of environmental parameter values are time of day, geolocation, surroundings (such as vehicle or building; and home or workplace or retail place), and activity (such as cooking, exercising, or driving). This is also valuable for improving the relevance of recommendations.

For example, a system for recommending advertisements favors advertisements for hotels when in an airport environment because people traveling by airplane are likely to stay in hotels. A system for recommending advertisements favors recommending umbrella advertisements on rainy days. A system for recommending songs would recommend children's songs when detecting acoustic properties of children's voices. A system for recommending foods to eat would recommend energy bars if it detects that a user has been jogging for 5 hours and celery if it has detected almost no user motion all day. Accordingly, the system can collect information about the user for a period of time, ranging from a short period to a long period, and based on the collected information provide a recommendation.

There are many appropriate ways to collect values of environmental parameters. Some examples are through sensors integrated into mobile or wearable devices, such as microphones, cameras, accelerometers, geolocation devices, WIFI presence detection, and clocks. Environmental parameters can also be detected on stationary devices, such as through RFID presence detection, thermometers, microphones, cameras, laser beam photo detectors, among other application-specific sensors. Values of some environmental parameters can be read directly from sensors or input devices. Some environmental parameters are calculated, such as by software functions. For example, presence of specific people requires facial recognition algorithms and databases of user face images.

Figure 12:
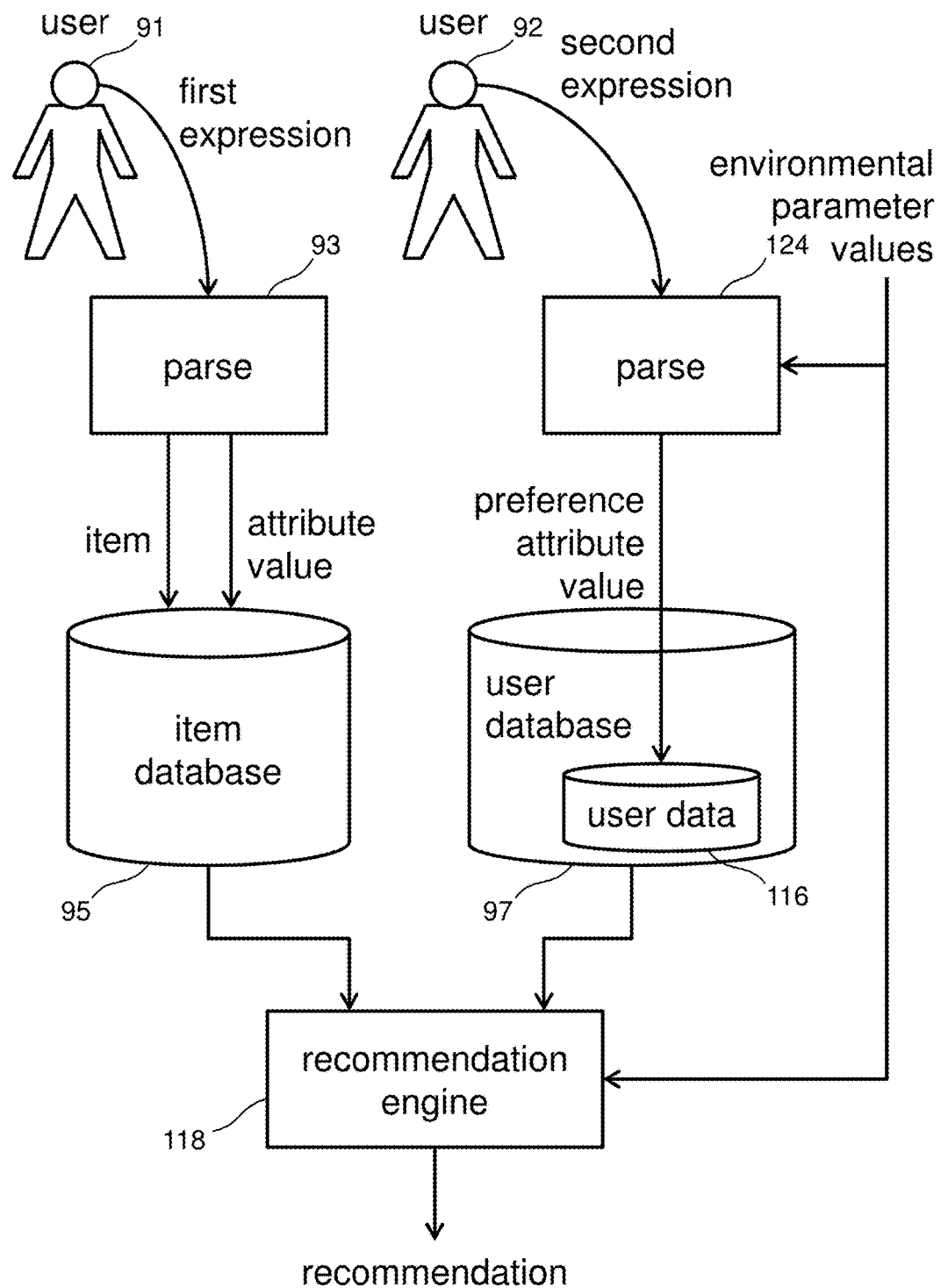
FIG. 12 illustrates parsing expressions to extract and store items attribute values and preference attribute values in databases and detecting environmental parameter values and using the data and environmental parameter values to condition parsing and produce recommendations, according to an embodiment.

Some embodiments weight natural language parsing by environmental parameter values. FIG. 12 shows such an embodiment. User 91 makes a first natural language expression that includes information that identifies and describing a particular item. Parser 93 parses the first expression to extract at least one identifier of an item and at least one value of an attribute of the item. The value of the attribute, in association with the identifier of the item is stored in an item database 95. Second user 92 makes a second natural language expression that includes information that identifies values of attributes that the user prefers. Parser 124 parses the second expression to extract at least one attribute that items can have, a value for the attribute, and identify that the second user 92 prefers such items with that value. The attribute value is stored in as user data 116 in association with the second user 92. User data 116 is placed within an entire database of users' preference vectors 97. Recommendation engine 118 classifies the user's likely preferences by computing hypotheses of unknown user preference attribute values using a machine learning algorithm on the user database 97 and the user profile vector 116 associated with user 92. The recommendation engine 118 then finds items in the item database 95 with attribute values that most closely match the known and hypothesized user preference vector values in order to produce a recommendation.

Parser 124 takes environmental parameter values as inputs. It uses them as weights to rescore parse hypotheses.

For example, if a user says, "I'd like to buy an apple" in a produce store, the parser outputs a "food type" preference value of "apple". If the same user say, "I'd like to buy an apple" in an electronics store, the parser outputs a "computer type" preference value of "apple". If the user says, "I'd like to buy an apple" in a clothing store, the parser outputs a "food type" preference value of "apple". If the same user says, "I'd like to buy an orange" in an electronics store, the parser outputs a "food type" preference value of "orange".

For another example, if a user says, "I don't like how it's getting dark outside" in the morning, the parser outputs a "light" preference value of "cloud cover", but if the user says, "I don't like how it's getting dark outside" in the early evening in autumn, the parser outputs a "true" preference value for "daylight savings time".

In some embodiments, such as the embodiment of FIG. 12, both the parser and the recommendation engine use environmental information to condition their outputs.

Figure 13:
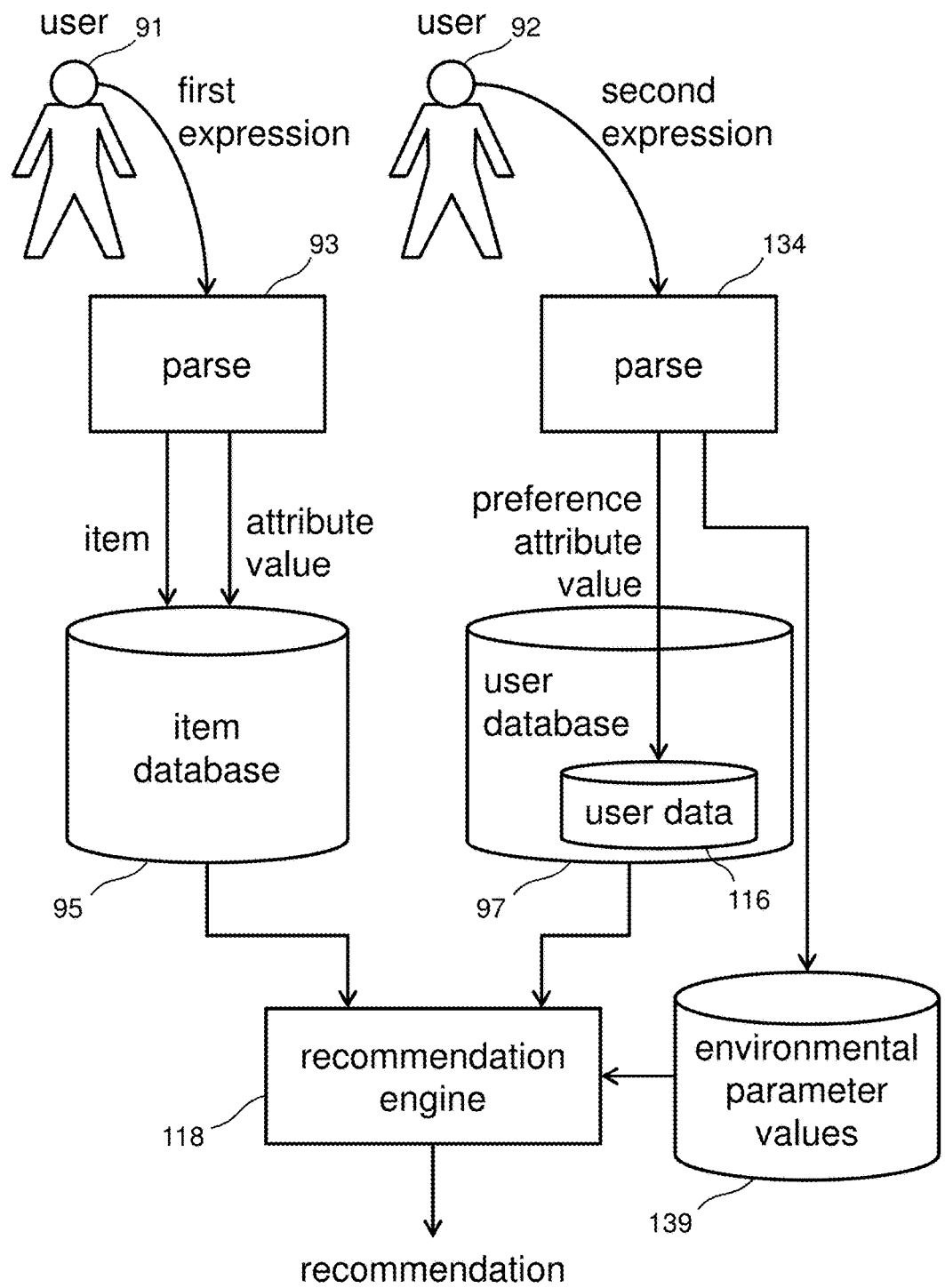
FIG. 13 illustrates parsing expressions to extract and store items attribute values and preference attribute values in databases and extracting and storing environmental parameter values and use the data to produce recommendations, according to an embodiment.

Some embodiments gather environmental information from user expressions. Some such embodiments store such environmental information and use it to condition recommendations. FIG. 13 shows such an embodiment. User 91 makes a first natural language expression that includes information that identifies and describing a particular item. Parser 93 parses the first expression to extract at least one identifier of an item and at least one value of an attribute of the item. The value of the attribute, in association with the identifier of the item is stored in an item database 95. Second user 92 makes a second natural language expression that includes information that identifies values of attributes that the user prefers. Parser 134 parses the second expression to extract at least one attribute that items can have, a value for the attribute, and identify that the second user 92 prefers such items with that value. The attribute value is stored in as user data 106 in association with the second user 92. User data 116 is placed within an entire database of users' preference vectors 97. Recommendation engine 118 classifies the user's likely preferences by computing hypotheses of unknown user preference attribute values using a machine learning algorithm on the user database 97 and the user profile vector 116 associated with user 92. The recommendation engine 118 then finds items in the item database 95 with attribute values that most closely match the known and hypothesized user preference vector values in order to produce a recommendation.

Figure 14:
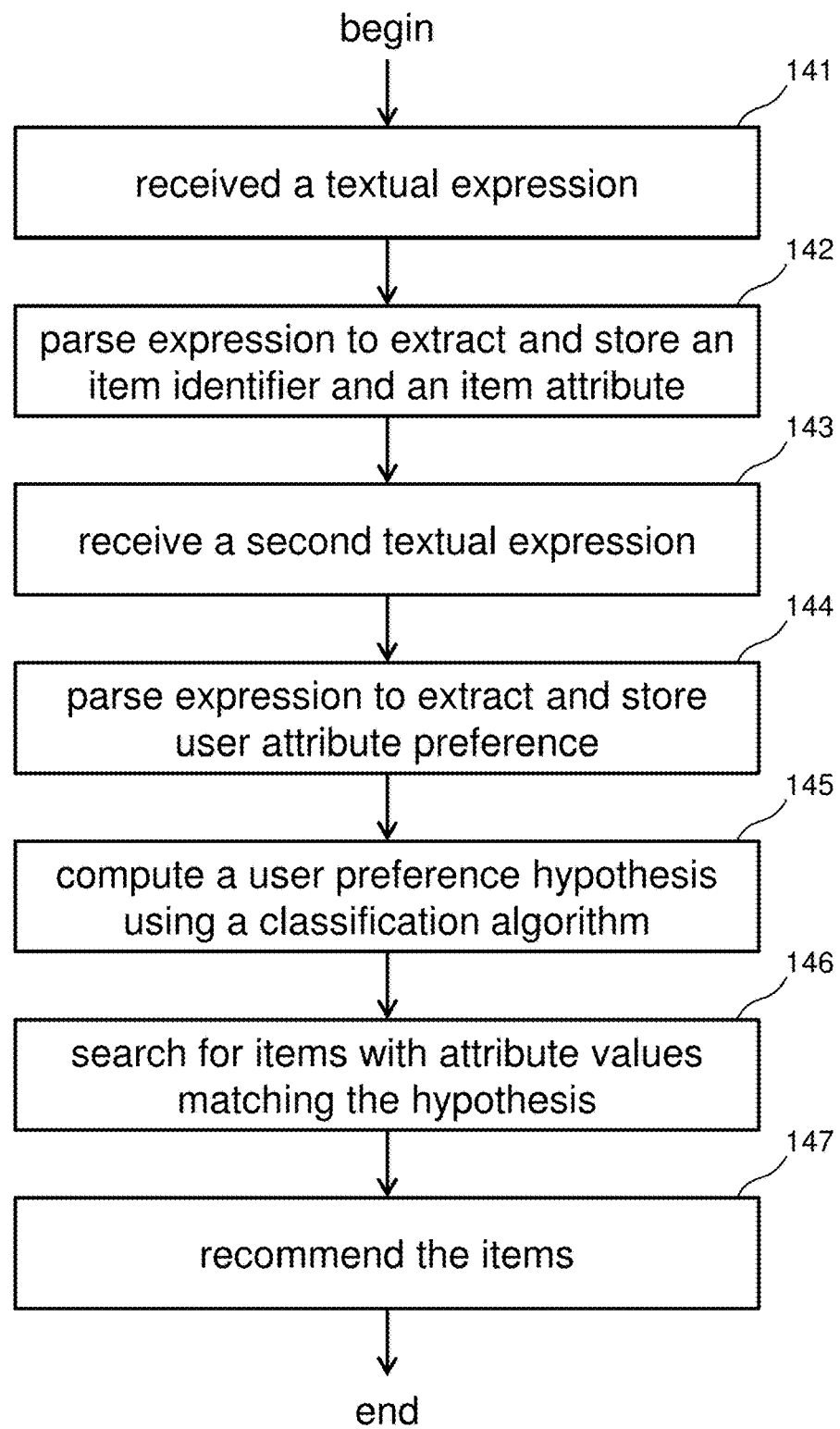
FIG. 14 illustrates a flowchart of parsing expressions to extract and store items attribute values and preference attribute values in databases and extracting and storing environmental parameter values and use the data to produce recommendations, according to an embodiment.

FIG. 14 shows a flow chart of a process for the embodiment of FIG. 13. In step 141 the process begins by receiving a textual expression, such as one from the internet or one from speech recognition. In step 142 the process parses the expression to extract information identifying an item and determine a value of an attribute of the item and then stores the attribute value in association with the item in an item database. In step 143 the process receives a second textual expression. In step 144 the process parses the second expression to extract information identifying a preferred value of an item attribute for a known user and stores that information in a user preference database. In step 145 the process uses a machine learning classification algorithm to compute a hypothesis for a preferred value of an attribute for which an actual preference is unknown. In step 146 the process searches the item database for items having an attribute value matching the hypothesized preferred attribute value. In step 147 the process provides the items with the hypothesized attribute value as recommendations to a user.

In the embodiment of FIG. 13, the parser 134 outputs environmental information if it is detected in user expressions. For example, if a user says, "today is so hot", the system stores value "hot" for a "weather temperature" parameter in storage 139. Recommendation engine 118 uses the "weather temperature" parameter value to select a specific layer of user preference values. For example, a system determines that whenever the "weather temperature" environmental parameter is "hot", the user expresses preferences for drink items with a "drink temperature" attribute value of "cold", but when the "weather temperature" parameter has value "cold", the user expresses preferences for drink items with "drink temperature" attribute "hot". When recommendation engine 118 produces a drink recommendation, it chooses items from item database 95 with "drink temperature" attribute value of "cold" or "hot" in respect to whether the environmental parameter "weather temperature" has value "hot" or "cold".

Aside from paring semantic information values from natural language expressions, some embodiments use acoustic, phonetic, or linguistic attributes of expressions to detect (or at least hypothesize) values of environmental information. For example, some embodiments analyze the intonation in a user's voice to determine the user's mood. If a system determines that the user is in a happy mood it recommends music items with a "mood" attribute value "happy" and if the user is in a sad mood the system recommends music items with a "mood" attribute of "happy", but if the user is in an overstimulated mood the system recommends music items with a "mood" attribute of "sad".

Figure 15:
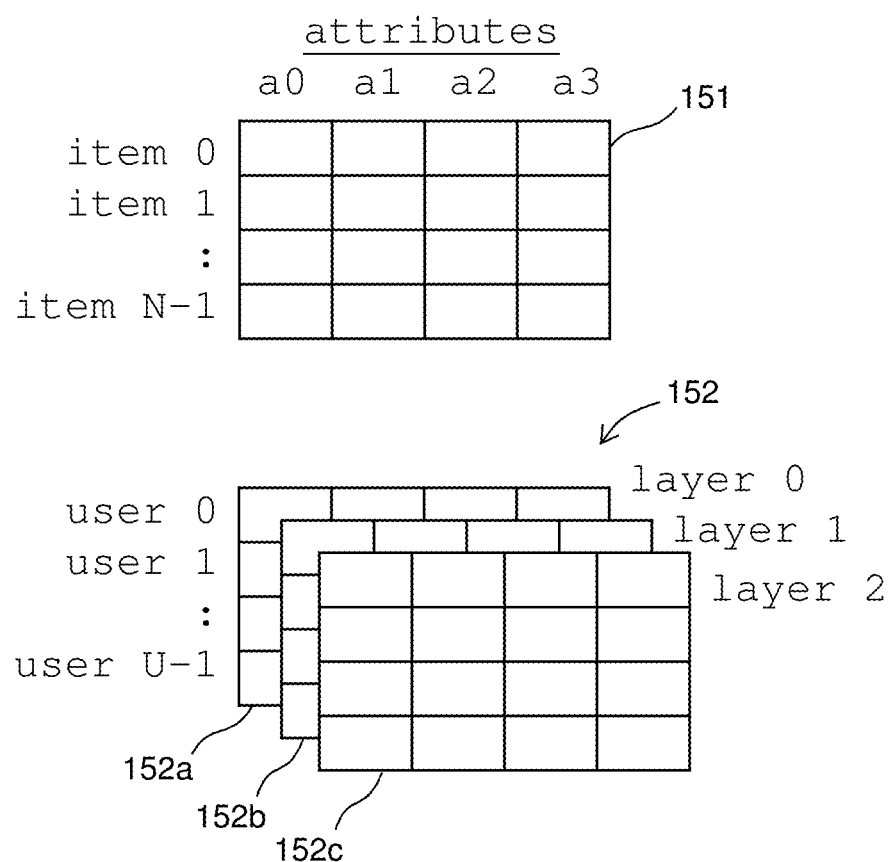
FIG. 15 illustrates an item database of attribute values with different sets of values for different activities, according to an embodiment.

FIG. 15 shows a logical representation of item database 151 juxtaposed with a user database 152. The user database 152 has three logical layers: layer 0 152a, layer 1 152b, and layer 2 152c. Each layer has a row for each of a number U of users. Database 151 has a column for each of the same attributes as those of item database 152. It is possible for database 152 to be sparse (many user preference attribute values unknown). Various known methods of storing sparse databases, efficiently, are appropriate for embodiments.

Different user attribute preference layers apply in the case of different combinations of environmental parameters. For example, one layer is used when a "weather temperature" parameter has value "hot"; a second layer is used when the "weather temperature" parameter has value "cold" and a "precipitation" parameter has a value "true"; and a third layer is used when the "weather temperature" parameter has value "cold" and the "precipitation" parameter has a value "false". For example, for the first layer, user 0 attribute 0 has value "t-shirt". For the second layer, user 0 attribute 0 has value "parka". For the third layer, user 0 attribute 0 has value "mackintosh".

Some systems provide that individual values of one or both of user preference attributes and item attributes may be expressed as conditions of environmental parameter values. For example, a music playing system that identifies a user's location, if a user says, "play some Mozart" while in an environmental parameter "location" is equal to "study hall" writes a value "if(location==study hall) Mozart" for a "music preference" attribute of the user. If the user says, "play some AC/DC" while in an environmental parameter "location" is equal to "road" and an environmental parameter "day" is equal to "Saturday" updates the value to "if(location==study hall) Mozart; if(location==road & day==Saturday) AC/DC" for a "music preference" attribute of the user.

Recommendation engines, according to such embodiments, if computing hypothesis values for sparse user preference vectors and when computing classifications or regressions choose the values that are valid under current environmental conditions and discard all values, otherwise.

An embodiment that uses environmental parameter value selected layers of preference values is useful because, in some conditions very many user attribute preference values change. For example, in weather temperature tends to change the drink temperature preference of users, but also shopping items, clothing items, desired vacation destinations, topics of conversation, among others. The use of conditional definitions of individual attribute values might require less storage space to represent in the database, but requires more processing at the granularity of individual attribute values.

Various ways of representing conditions and conditional values besides text string are appropriate. Strings give flexibility for the richest types of natural language expressions that any speaker chooses, but provide for fewer possibly-useful matches if different users use synonyms. Some embodiments apply synonym detection algorithms to alleviate that shortcoming. Some embodiments use enumerated values, where each possible value for an attribute or environmental parameter has a unique ID. For example, in an embodiment, a database of furniture store items has, for "chair" items a parameter "chair leg material", which can have value, "1", "2", "3", or "4", where "1" represents metal, "2" represents wood, "3" represents plastic", and "4" represents any other type of material. Similarly a database of shopper preference stores, for users, a "chair leg material" preference with the same possible values. Using enumerated values improves the number of likely matches between users or between users and items, which improves the accuracy of classification algorithms. However, the resolution of possible chair leg types is limited to those that a system designer chose to enumerate. For the present example, shoppers with a preference for dark wood styling or light wood styling would get recommendations based on all other users with a preference for wood chair leg types, regardless of the other users' wood color preference.

Activities

Activities such as cooking, and working out are a kind of environmental parameter. Different user preference database layers are useful for different activities. For example, users might wish to listen to music that matches a certain activity or a certain mood. For example, a user might wish to listen to "relaxing music for dinner" or "music for a 90s themed party".

Artificial intelligence systems apply machine learning algorithms to improve the quality of recommendations based on prior user expressions. Some embodiments learn specific user preferences by, after a recommendation is made for a particular mood or activity, accepting user feedback about whether the recommendation was or was not desirable. Some embodiments solicit feedback, some passively observe for feedback indications. Some embodiments capture user expressions of specific ways in which recommendations could be improved, and use the information to update or add user attribute preference values. For example, the users may say, "dinner music should be more like fly me to the moon" or "what you were playing last night during dinner was a lot more appropriate" or "I loved the previous song, but this one is too jazzy". Artificial intelligence systems further use the user's specific feedback in classification algorithms to compute hypotheses for user preference vectors for other users with some known matching preference attribute values.

Recommendation Engines

Figure 16:
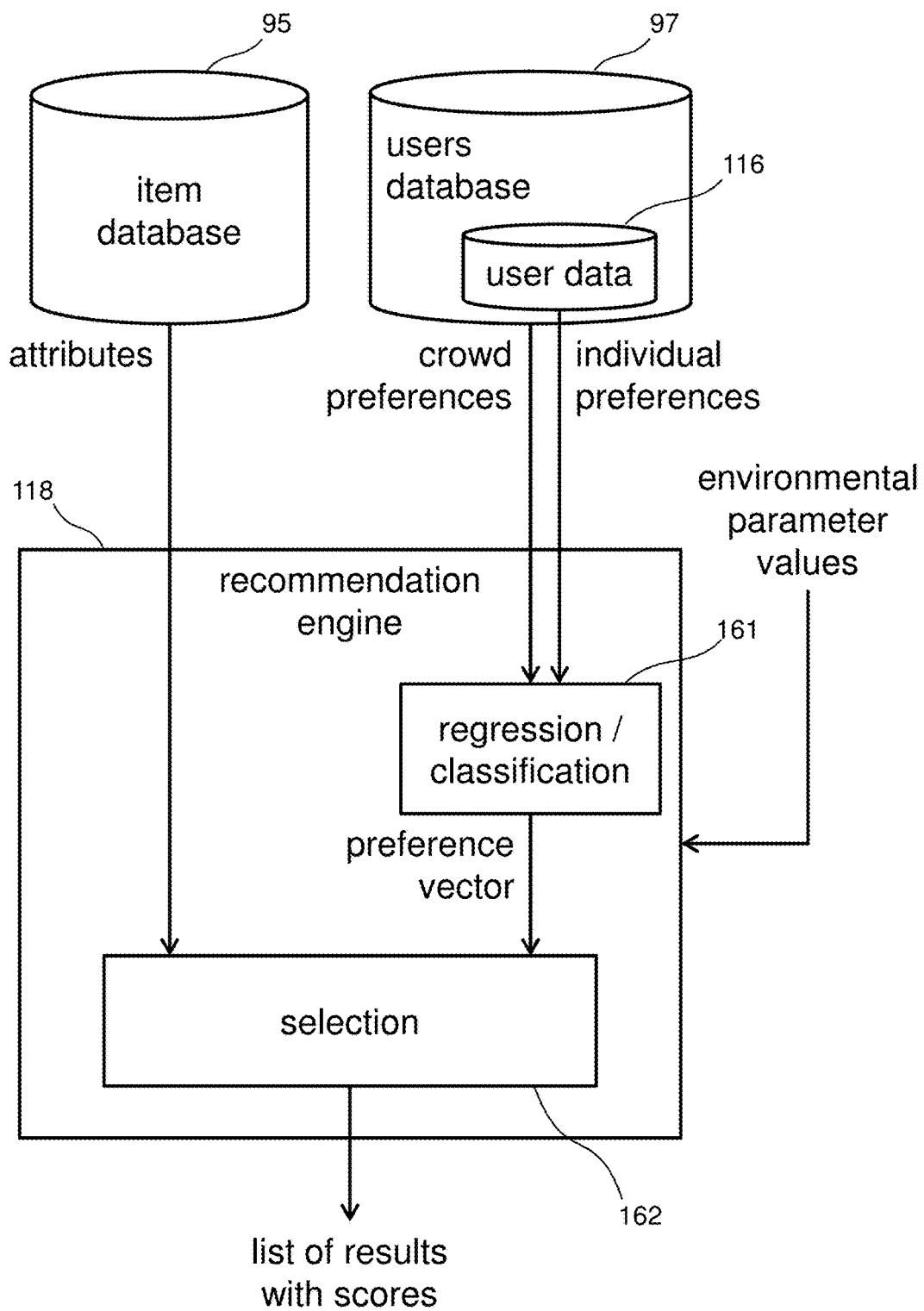
FIG. 16 illustrates a recommendation engine, according to an embodiment.

Many types of recommendation engines are known in the art, and practitioners will recognize appropriate ones for particular applications. FIG. 16 shows an embodiment of a recommendation engine 118. It chooses a user preference vector 116 from a database layer indicated by environmental parameter values. The user preference vector 116 has at least one interesting attribute preference value unknown and at least one, and preferably more than a few, others known. Recommendation engine 118 also reads a multiplicity of other user preference vectors from user database 97 from a layer indicated by the environmental parameter values, each having a value known for the unknown attribute of the user preference vector. Recommendation engine 118 performs regression for parameters having continuous values or classification for parameters having enumerable values. The regression or classification 161 produces a preference vectors with a distribution of hypothesized values for the unknown attribute value in the user preference vector.

A selection stage 162 reads items from item database 95, the items having values for attributes corresponding to the known and hypothesized user preference attributes. The selection stage 162 computes the similarity between each item's attribute value vectors and the user preference vector, but weighting the similarity comparison by the probability of values of the hypothesized attribute values. Selection stage 162 then sorts the database items according to similarity score and outputs a list of the items with the highest similarity scores. The recommendation engine 118 also outputs the scores corresponding to each of the items in the list.

Creating Attributes and Values

In some scenarios, a user describes an item or a user preference as having an attribute value that is unknown to a system. For example, if a user says, "I used to like Green Day until they became such pseudopunktaculous sellouts", most systems would not understand "pseudopunktaculous" as a value for a "genre" attribute.

Some embodiments, upon parsing from a natural language expression an unknown value for a known attribute add the value to a list of known values of the attribute. Adding new values enables systems to have more granularity for classification algorithms to process, and thereby improve recommendation results, even for other users and other items.

As a result, if another user later says "play me some pseudopunktaculous music", the system will play music by Green Day. The system would also update a user database entry, for the second user, to have a value "pseudopunktaculous" for a "music genre" attribute preference.

Figure 17:
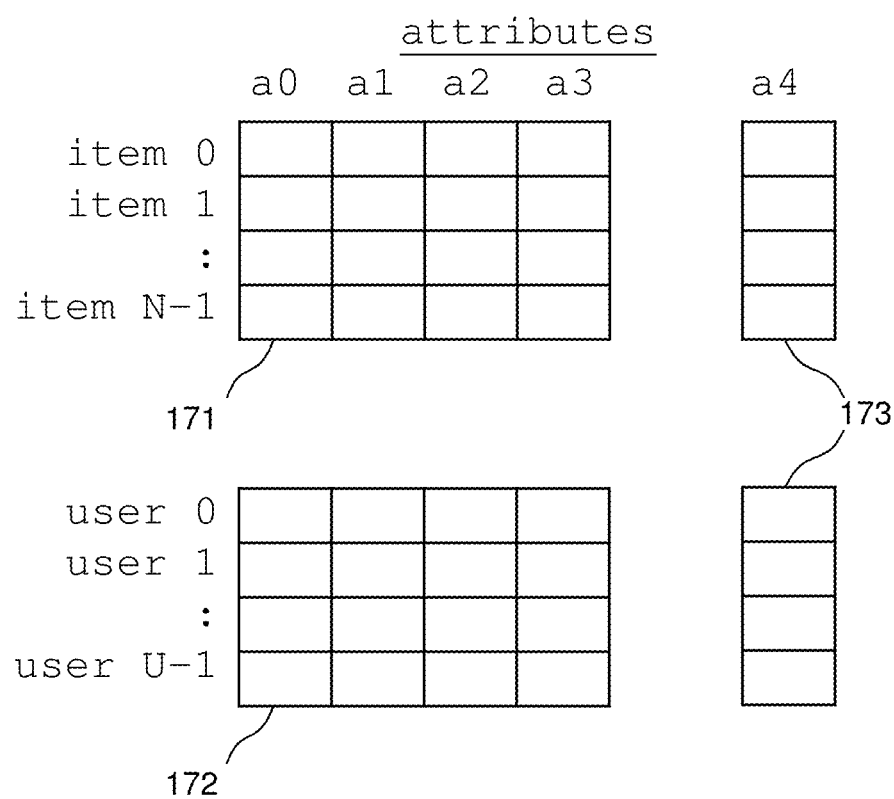
FIG. 17 illustrates adding a new attribute to an item database, according to an embodiment.

FIG. 17 shows a logical representation of an item database 171. Each row represents a particular item. The database 171 has a row for each of a number N of items. Database 171 has a column for each of a number of attributes. This embodiment begins with four attributes, named a0, a1, a2, and a3. The embodiment detects an unknown attribute parsed from a natural language expression. In response, the database adds a new attribute, a4, as a column 173 with a possible value for each item in the database. Likewise, the embodiment adds the new column 173 to a corresponding user preference database 172. The value for all attribute a4 fields is unknown for all items and users, except that any user preferences and items indicated in the natural language expression as having a value for the attribute will have the value assigned to their attribute a4 fields.

In some scenarios, a user describes an item or a user preference as having an attribute that is unknown to the system. For example, if a user says, "The Galaxy SOHO building is as curvy as a grand piano lid", most systems would not understand "curviness" as an attribute of a building. In response to the expression, the embodiment of FIG. 15 would add an attribute "curviness" to database items and assign it the value "grand piano" for the "Galaxy SOHO building" item.

Scenarios and Physical Embodiments

Figure 18:
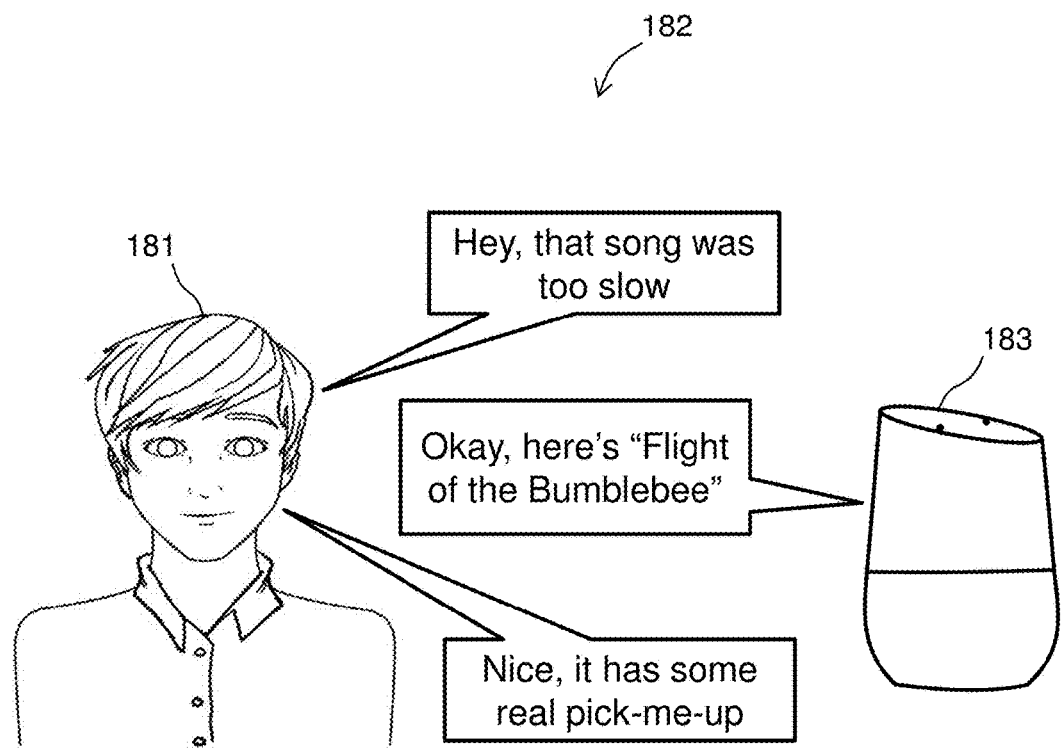
FIG. 18 illustrates a human-machine dialog with natural language feedback, according to an embodiment.

FIG. 18 shows an embodiment of a conversation 182 between a user 181 and a voice-controlled music playing device 183. The user makes a natural language expression "Hey, that song was too slow". The music player 183 parses the expression to determine: a value "too slow" for an item attribute "song speed"; and a user preference of "not slow" for a "song speed" attribute. The music player 183 stores the values in an item database and user preference database respectively.

In some embodiments, devices such as music players or automobiles store user preferences in a local database. In some embodiments, devices store user preferences remotely on a server. Some embodiments cache user preferences locally and sync with a remote server when access is available. This is useful for embodiments, such as automobiles, that may be connected to the internet at some times but disconnected at other times.

The music player 183 proceeds to perform a recommendation that results in the fast piece of classical music, "Flight of the Bumblebee". The music player 183 responds to the user 181 in speech and plays the song. The user responds, "Nice, it has some real pick-me-up". The music player 183 parses that natural language expression and determines that "pick-me-up" is an unknown attribute of songs. It adds a "pick-me-up" attribute field to its item database and user database and assigns the value "true" to the "pick-me-up" attribute of the song item "Flight of the Bumblebee".

Figure 19:
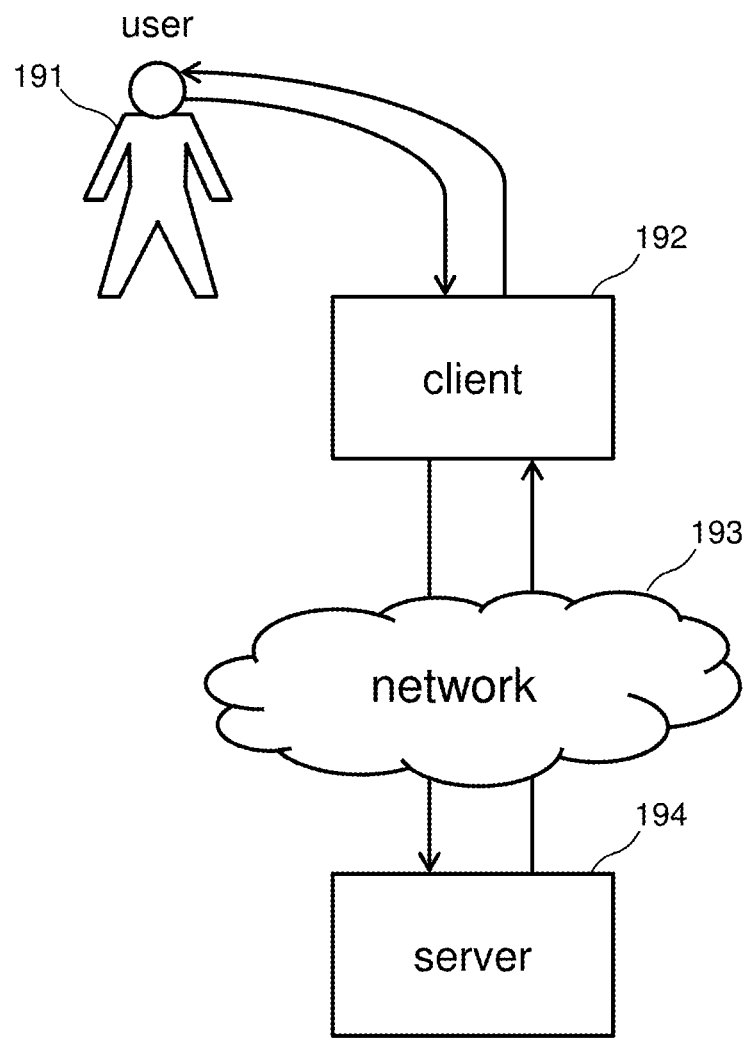
FIG. 19 illustrates a cloud-based client-server system, according to an embodiment.

Some embodiments are servers that perform natural language processing and store item and user preference databases. FIG. 19 shows such an embodiment. A user 191 interfaces to a client device 192. The client device 192 may be any device that includes the ability to send and receive information. Some examples of client device 192 are mobile phones, other portable devices, smart speakers, robots, vehicles, and remote servers. Some client devices are stand-alone machines and some are systems of coupled servers that run appropriate software. Various types of client devices, such as client device 192, receive utterances from users through various input methods. Some such input methods are typing on a keyboard, moving and clicking a mouse, tapping a touch screen, swiping on a touch screen, making gestures before a camera, and neural activity sensing. Various types of client devices, such as client device 192, provide responses or feedback or recommendations to the user through various output methods, such as text on a screen, icons on a screen, images, audio tones, synthesized speech, vibration, and neural stimulation.

The client device 192 communicates through network 193 with the server 194. The server 194 performs the natural language processing, storing of items and user preferences, and production of recommendations. The server 194 communicates responses over network 193 to the client 192, which provides an interface to the user 191.

Some embodiments are served by a voice interface between user 191 and client device 192. some embodiments are served by manual interfaces such as keyboard or touch screens. Some embodiments are served by cognitive communication devices (CCDs). CCDs take advantage of the fact that human thoughts are a form of natural language expressions. Various other human machine interfaces are known to practitioners.

Figure 20:
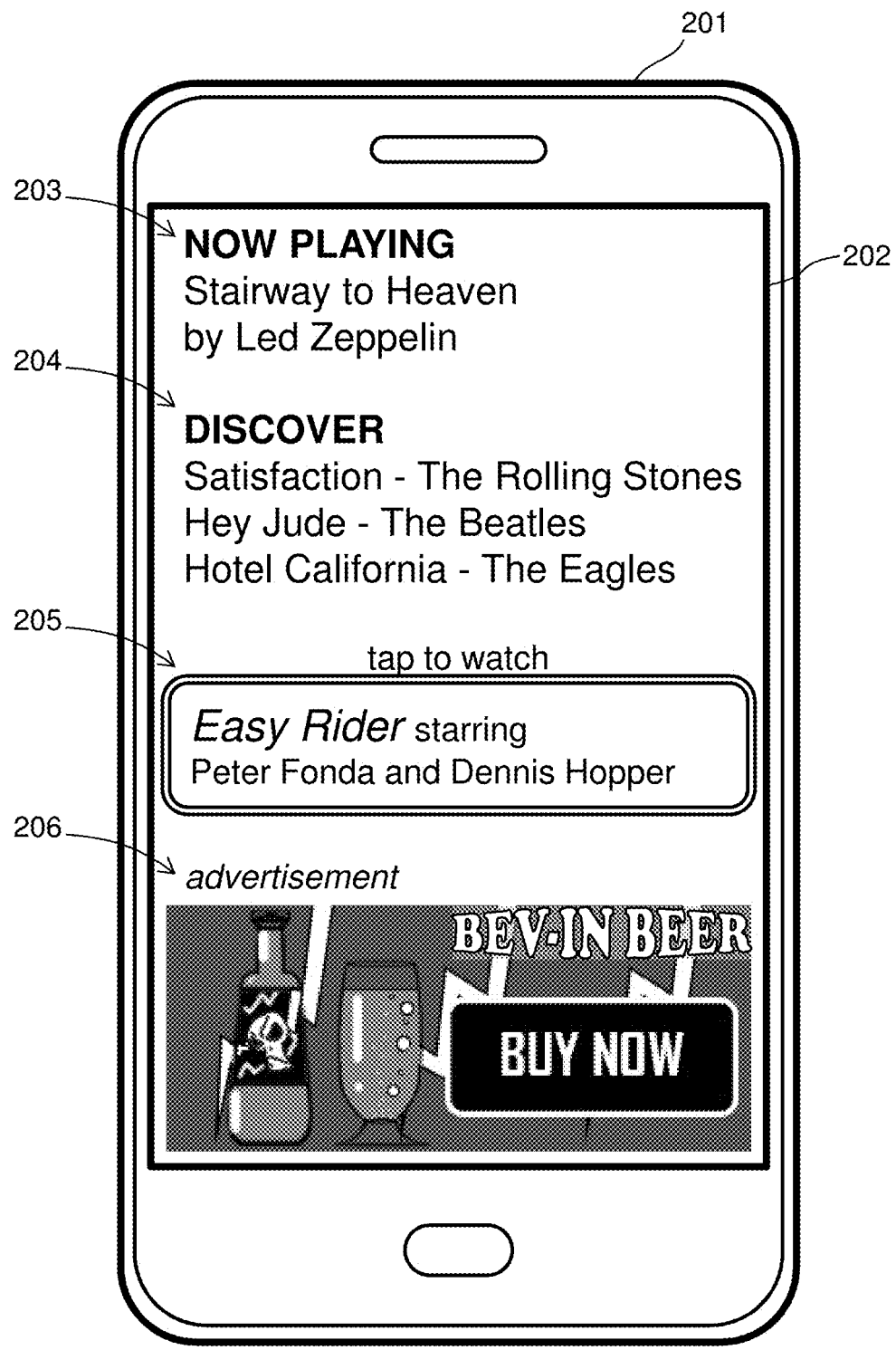
FIG. 20 illustrates a mobile phone application using natural language recommendation feedback for music, movie, and product purchase recommendations, according to an embodiment.

FIG. 20 shows an embodiment that is a mobile phone 201 comprising a touch screen display interface 202. The phone 201 runs an app that plays music. While the music is playing, phone 201 displays the title and artist of the currently playing music. The song is chosen as a recommendation, based on the phone user's previously expressed preferences and the values of attributes known about the song.

The phone 201 also displays a list of other songs and artists 204. The songs and artists are ones from a list of recommendations. The songs have similar attribute values that all match well with attribute preference values of the phone user.

The phone 201 also displays a movie link 205. Though a movie is a different type of item from a song, movies and songs have some common attributes such as, including but not limited to, "year created". The movie link 205 is a result of a recommendation based on its attribute values and their similarity to preference attribute values of the phone user.

The phone 201 also displays an advertisement 206. Advertisement items have few attributes in common with songs or movies, but the advertisement 206 is a result of a recommendation based on similarity between user attribute preference values of the phone user and user attribute preferences of other users who tapped on the same advertisement.

The storage of music, movie, and advertisements as well as the computation and production of recommendations, may be on different servers operated by different operators and are each embodiments in their own right.

Figure 21A:
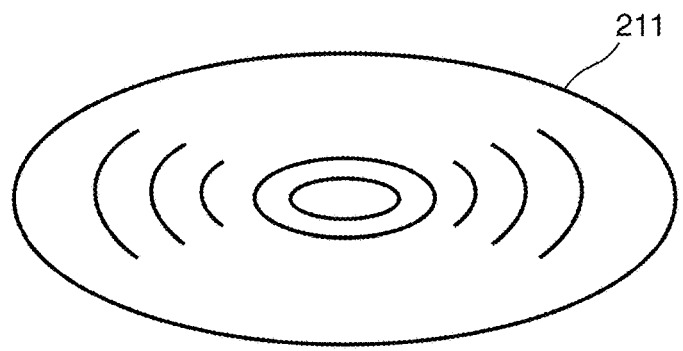
FIG. 21A illustrates a rotating magnetic non-transitory computer readable medium, according to an embodiment.
Figure 21B:
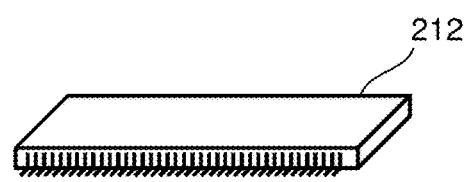
FIG. 21B illustrates a packaged non-volatile memory type of non-transitory computer readable medium, according to an embodiment.

Some embodiments are non-transitory computer readable media that store code that, if executed by a computer system, would cause the computer system to perform embodied functions and processes. FIG. 21A shows an embodiment of a non-transitory computer readable medium that is a rotating magnetic disk 211. FIG. 21B shows an embodiment of a non-transitory computer readable medium that is a Flash RAM chip 212.

Figure 21C:
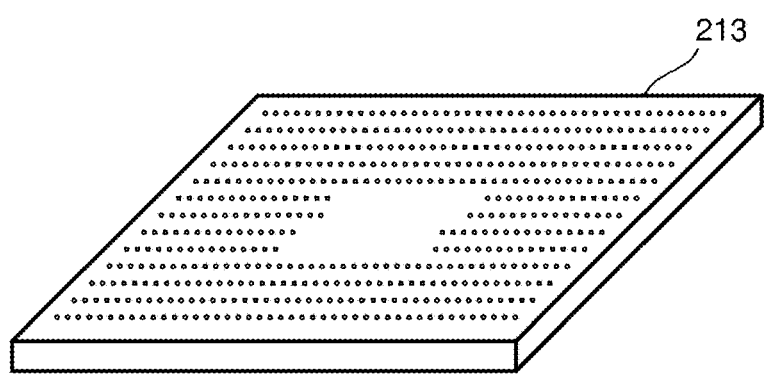
FIG. 21C illustrates a packaged system-on-chip with a ball grid array side visible, according to an embodiment.
Figure 21D:
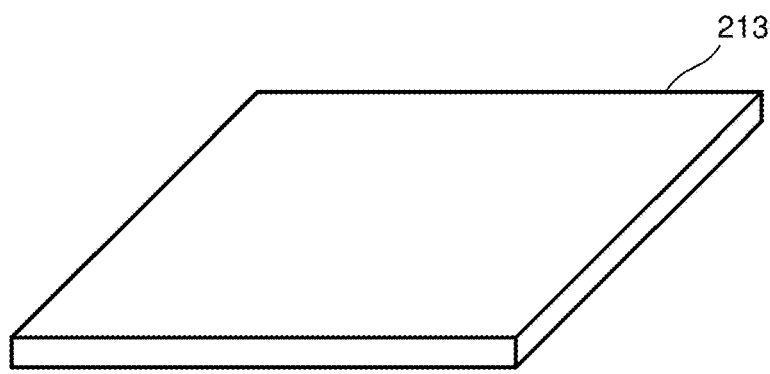
FIG. 21D illustrates a packaged system-on-chip with its top side visible, according to an embodiment.

Some embodiments are computer chips having processors that perform appropriate functions and processes. FIG. 21C shows an embodiment of a packed system-on-chip (SoC) 213 with a ball-grid array of solder balls for attachment to printed circuit boards. FIG. 21D shows the top side of SoC 213.

Figure 22:
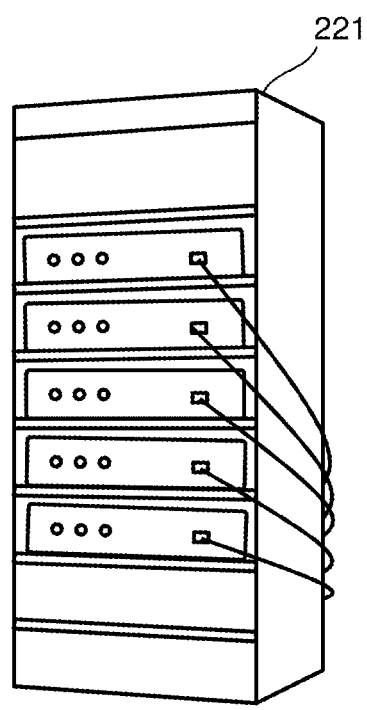
FIG. 22 illustrates a server system, according to an embodiment.

FIG. 22 shows an embodiment that is a rack-mounted server system 221. It comprises a multiplicity of processors that run software in parallel to process numerous natural language expressions simultaneously, store and retrieve user preference attribute values and item values simultaneously, and run recommendation algorithms simultaneously.

Figure 23:
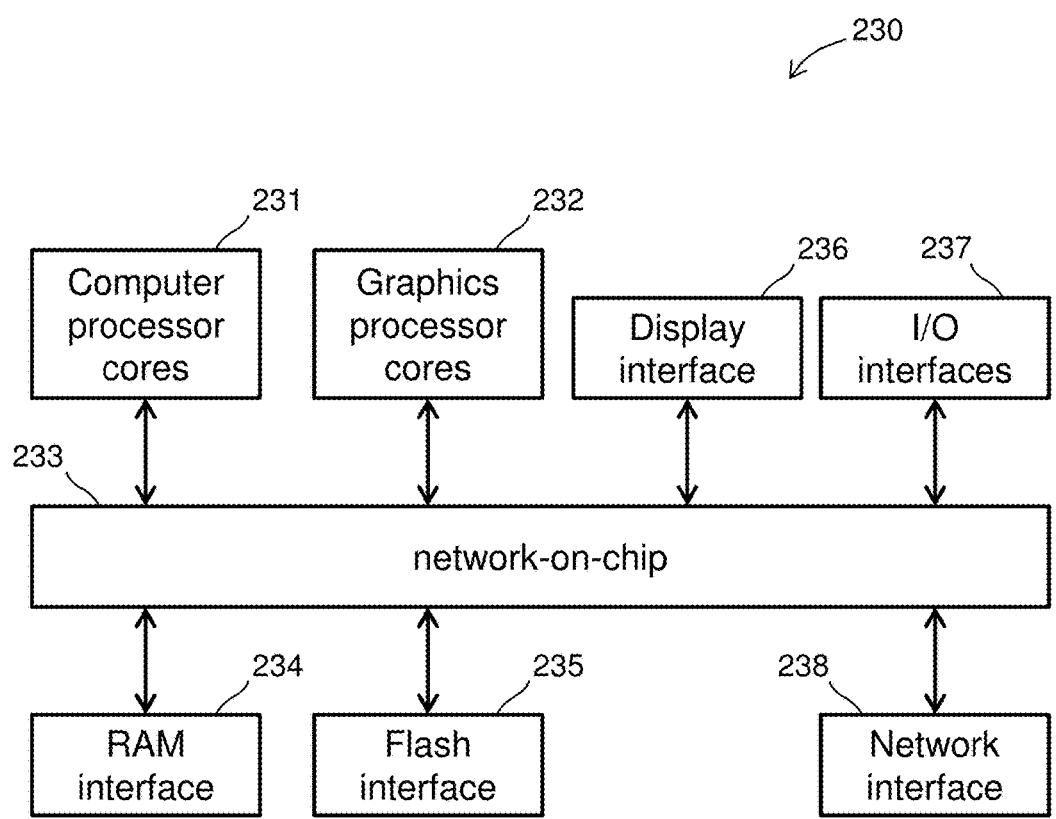
FIG. 23 illustrates block diagram of a system-on-chip, according to an embodiment.

FIG. 23 shows a block diagram of a system-on-chip 230. It comprises a cluster of computer processor (CPU) cores 231 and a cluster of graphics processor (GPU) cores 232. The processors are connected through a network-on-chip 233 to an off-chip dynamic random access memory (DRAM) interface 234 and Flash interface 235. System-onchip 230 also has a display interface 236 and I/O interface module 237 coupled to the memory interfaces. The I/O interface enables touch screen interfaces, microphones, speakers, and USB devices, such as keyboards and mice, among others, to access the memory interfaces. System-on-chip 230 also comprises a network interface 238 to allow the processors to access the Internet through wired or wireless connections. By executing instructions stored in RAM devices through interface 234 or Flash devices through interface 235, the CPUs 231 and GPUs 232 perform appropriate functions and processes.

Figure 24:
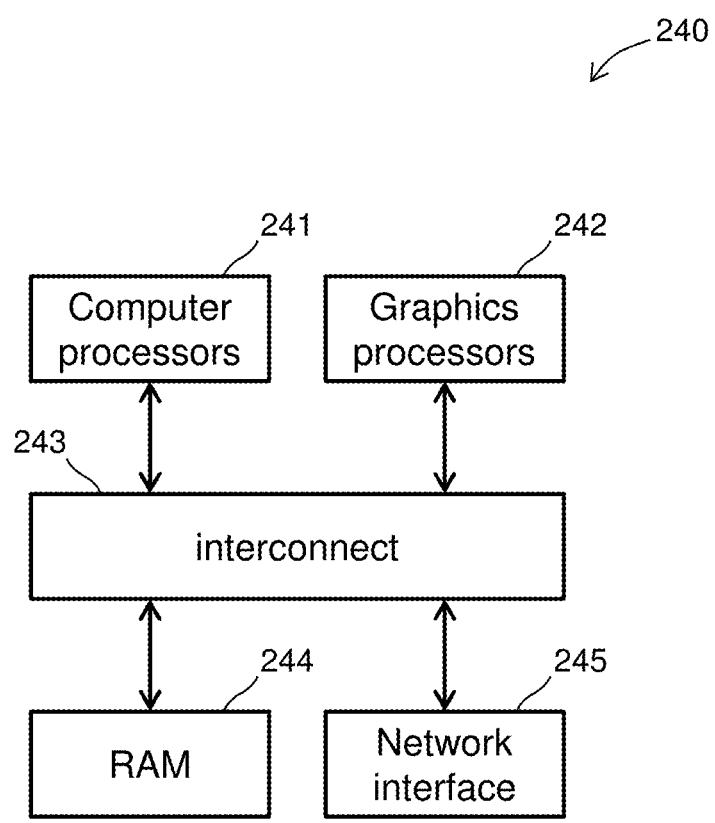
FIG. 24 illustrates a block diagram of a server computer system, according to an embodiment.

FIG. 24 shows a block diagram of a server system 240. It comprises an array of CPUs 241 and an array of GPUs 242 connected through a board-level interconnect 243 to a RAM 244 and network interface 245. By executing instructions stored in RAM 244, the CPUs 241 and GPUs 242 perform appropriate functions and processes.

Although the invention has been shown and described with respect to a certain preferred embodiment or embodiments, it is obvious that equivalent alterations and modifications will occur to others skilled in the art upon the reading and understanding of this specification and the drawings. In particular regard to the various functions performed by the above described components (assemblies, devices, systems, etc.), the terms (including a reference to a "means") used to describe such components are intended to correspond, unless otherwise indicated, to any component which performs the specified function of the described component (i.e., that is functionally equivalent), even though not structurally equivalent to the disclosed structure which performs the function in the herein illustrated exemplary embodiments of the invention. In addition, while a particular feature of the invention may have been disclosed with respect to only one of several embodiments, such feature may be combined with one or more other features of the other embodiments as may be desired and advantageous for any given or particular application.

The behavior of either or a combination of humans and machines (instructions that, when executed by one or more computers, would cause the one or more computers to perform methods according to the invention described and claimed and one or more non-transitory computer readable media arranged to store such instructions) embody methods described and claimed herein. Each of more than one non-transitory computer readable medium needed to practice the invention described and claimed herein alone embodies the invention.

Some embodiments of physical machines described and claimed herein are programmable in numerous variables, combinations of which provide essentially an infinite variety of operating behaviors. Some embodiments herein are configured by software tools that provide numerous parameters, combinations of which provide for essentially an infinite variety of physical machine embodiments of the invention described and claimed. Methods of using such software tools to configure hardware description language representations embody the invention described and claimed. Physical machines can embody machines described and claimed herein, such as: semiconductor chips; hardware description language representations of the logical or functional behavior of machines according to the invention described and claimed; and one or more non-transitory computer readable media arranged to store such hardware description language representations.

In accordance with the teachings of the invention, a client device, a computer and a computing device are articles of manufacture. Other examples of an article of manufacture include: an electronic component residing on a motherboard, a server, a mainframe computer, or other special purpose computer each having one or more processors (e.g., a Central Processing Unit, a Graphical Processing Unit, or a microprocessor) that is configured to execute a computer readable program code (e.g., an algorithm, hardware, firmware, and/or software) to receive data, transmit data, store data, or perform methods.

An article of manufacture or system, in accordance with various aspects of the invention, is implemented in a variety of ways: with one or more distinct processors or microprocessors, volatile and/or non-volatile memory and peripherals or peripheral controllers; with an integrated microcontroller, which has a processor, local volatile and non-volatile memory, peripherals and input/output pins; discrete logic which implements a fixed version of the article of manufacture or system; and programmable logic which implements a version of the article of manufacture or system which can be reprogrammed either through a local or remote interface. Such logic could implement a control system either in logic or via a set of commands executed by a processor.

Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents and equivalents developed in the future, i.e., any elements developed that perform the same function, regardless of structure.

The scope of the invention, therefore, is not intended to be limited to the exemplary embodiments shown and described herein. Rather, the scope and spirit of present invention is embodied by the appended claims.

What is claimed is:

1. A non-transitory computer readable medium storing code that, if executed by a computer system, would cause the computer system to:
   parse a first person's first natural language expression to identify an item and determine an item attribute value;
   store, in an item database, the value in association with the attribute of the item;
   parse a second person's second natural language expression from an identified user to determine a value preference for the attribute;
   store, in a user database, the preference for the attribute in association with the identified user; and
   use a recommendation engine on the item attribute value and the preference associated with the identified user to produce a recommendation.

2. The non-transitory computer readable medium of claim 1 wherein the first natural language expression and the second natural language expression are spoken.

3. The non-transitory computer readable medium of claim 1 that would further cause the computer system to:
   store, in the item database, a value of an environmental parameter in association with the item attribute value, wherein the recommendation engine considers the value of an environmental parameter and the current environment in producing the recommendation.

4. The non-transitory computer readable medium of claim 3 wherein the environmental parameter is a type of activity.

5. The non-transitory computer readable medium of claim 1 wherein the value is expressed relative to a reference item, and the non-transitory computer readable medium would further cause the computer system to store, in the item database, a reference to the reference item in association with the value of the attribute of the item, whereby the item attribute value can be computed from the corresponding value of the attribute of the reference item.

6. The non-transitory computer readable medium of claim 1 that would further cause the computer system to derive values of a user attribute vector by classifying the identified user based on attributes of other users in the user database.

7. The non-transitory computer readable medium of claim 1 wherein the recommendation engine produces a score associated with the recommendation.

8. The non-transitory computer readable medium of claim 1 wherein the second natural language expression is a command.

9. The non-transitory computer readable medium of claim 8 wherein the command specifies a time period.

10. The non-transitory computer readable medium of claim 1 that would further cause the computer system to parse the second natural language expression to determine a value of an environmental parameter.

11. The non-transitory computer readable medium of claim 1 that would further cause the computer system to:
determine an activity; and
associate the user preferences for the attribute with the activity.

12. The non-transitory computer readable medium of claim 11 wherein determining the activity is by parsing the second natural language expression.

13. A non-transitory computer readable medium storing code that, if executed by a computer system, would cause the computer system to:
parse a natural language expression from an identified user to:
identify an item and determine a value for an attribute of the item; and
determine a value preference for the attribute, including value attributes with values derived from a second user's natural language expression;
store, in an item database, the value in association with the attribute of the item;
store, in a user database, the preference for the attribute in association with the identified user; and
provide a recommendation based on the value and the preference.

14. The non-transitory computer readable medium of claim 13 wherein the natural language expression is spoken.

15. The non-transitory computer readable medium of claim 13 that would further cause the computer system to:
associate the value preference with a value of an environmental parameter.

16. A non-transitory computer readable medium storing code that, if executed by a computer system, would cause the computer system to:
parse a natural language expression about an item to identify:
an item;
an attribute of the item; and
a non-numerical value of the attribute;
search a database for values of the attribute; and
in response to not finding the value of the attribute, enumerating the value as a new recognized value of the attribute in the database.

17. The non-transitory computer readable medium of claim 16 that would further cause the computer system to:
store the value of the attribute in association with the item; and
store information descriptive of the speaker in association with the value.

18. A non-transitory computer readable medium storing code that, if executed by a computer system, would cause the computer system to:
parse a natural language expression about an item to identify:
an item; and
an attribute of the item;
search a database for presence of the attribute; and
in response to not finding the attribute, adding the attribute as a new attribute defining of at least the identified item.

19. The non-transitory computer readable medium of claim 18 that would further cause the computer system to enumerate the value as a possible value of the attribute.

* * * * *